United States Patent
Bunha et al.

(10) Patent No.: US 11,101,077 B2
(45) Date of Patent: *Aug. 24, 2021

(54) CONDUCTIVE POLYMER DISPERSION FOR IMPROVED RELIABILITY

(71) Applicant: KEMET Electronics Corporation, Fort Lauderdale, FL (US)

(72) Inventors: Ajaykumar Bunha, Simpsonville, SC (US); Antony P. Chacko, Simpsonville, SC (US); Yaru Shi, Simpsonville, SC (US); Qingping Chen, Simpsonville, SC (US); Philip M. Lessner, Simpsonville, SC (US)

(73) Assignee: KEMET Electronics Corporation, Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/940,869

(22) Filed: Jul. 28, 2020

(65) Prior Publication Data

US 2020/0357577 A1 Nov. 12, 2020

Related U.S. Application Data

(60) Division of application No. 16/435,762, filed on Jun. 10, 2019, now Pat. No. 10,943,742, which is a
(Continued)

(51) Int. Cl.
*H01G 9/00* (2006.01)
*H01G 9/042* (2006.01)
(Continued)

(52) U.S. Cl.
CPC .......... *H01G 9/0036* (2013.01); *C08F 12/30* (2013.01); *C08F 212/14* (2013.01); *C08F 212/30* (2020.02); *C09D 4/06* (2013.01); *C09D 5/24* (2013.01); *C09D 7/65* (2018.01); *C09D 7/67* (2018.01); *C09D 7/68* (2018.01); *C09D 125/18* (2013.01); *C09D 133/14* (2013.01); *C09D 165/00* (2013.01); *H01G 9/025* (2013.01); *H01G 9/042* (2013.01); *H01G 9/15* (2013.01); *C08G 2261/1424* (2013.01); *C08G 2261/3223* (2013.01); *C08G 2261/794* (2013.01); *H01G 9/028* (2013.01)

(58) Field of Classification Search
CPC ... C09D 4/06; C09D 5/24; C09D 7/65; C09D 125/18; C09D 133/14; C09D 165/00
See application file for complete search history.

(56) References Cited

U.S. PATENT DOCUMENTS 8,721,929 B2 * 5/2014 Loevenich ............. H01B 1/127
252/500
8,824,121 B2 * 9/2014 Biler ..................... H01G 9/028
361/516

(Continued)

*Primary Examiner* — Katie L. Hammer
(74) *Attorney, Agent, or Firm* — Joseph T. Guy; Patent Filing Specialist Inc.

(57) ABSTRACT

A dispersion comprising first particles comprising conductive polymer and polyanion and second particles comprising the conductive polymer and said polyanion wherein the first particles have an average particle diameter of at least 1 micron to no more than 10 microns and the second particles have an average particle diameter of at least 1 nm to no more than 600 nm.

13 Claims, 2 Drawing Sheets

Related U.S. Application Data continuation-in-part of application No. 16/165,649, filed on Oct. 19, 2018, now Pat. No. 10,650,980, which is a division of application No. 15/787,126, filed on Oct. 18, 2017, now Pat. No. 10,658,121.

(51) Int. Cl.

| | | |
|---|---|---|
| *C09D 125/18* | (2006.01) | |
| *C09D 5/24* | (2006.01) | |
| *C09D 4/06* | (2006.01) | |
| *C09D 165/00* | (2006.01) | |
| *C08F 12/30* | (2006.01) | |
| *C09D 133/14* | (2006.01) | |
| *C09D 7/65* | (2018.01) | |
| *H01G 9/15* | (2006.01) | |
| *H01G 9/025* | (2006.01) | |
| *C08F 212/14* | (2006.01) | |
| *C09D 7/40* | (2018.01) | |
| *H01G 9/028* | (2006.01) | |

(56) References Cited

U.S. PATENT DOCUMENTS

| | | | | |
|---|---|---|---|---|
| 2007/0171597 A1* | 7/2007 | Merker | ............... | H01G 9/0036 |
| | | | | 361/523 |
| 2013/0188295 A1* | 7/2013 | Chacko | ............... | C08G 75/06 |
| | | | | 361/525 |
| 2015/0187504 A1* | 7/2015 | Takatani | ............... | C08L 65/00 |
| | | | | 427/80 |
| 2016/0012971 A1* | 1/2016 | Takatani | ............... | H01G 9/151 |
| | | | | 29/25.03 |

* cited by examiner

CONDUCTIVE POLYMER DISPERSION FOR IMPROVED RELIABILITY

CROSS-REFERENCE TO RELATED APPLICATIONS

The present invention is a divisional application of pending U.S. patent application Ser. No. 16/435,762 filed Jun. 10, 2019 which is, in turn, a continuation-in-part of U.S. patent application Ser. No. 16/165,649 filed Oct. 19, 2018 now U.S. Pat. No. 10,650,980 issued May 12, 2020 which, in turn, is a divisional application of U.S. patent application Ser. No. 15/787,126 filed Oct. 18, 2017 now U.S. Pat. No. 10,658,121 issued May 19, 2020 all of which are incorporated herein by reference.

BACKGROUND

The present invention is related to improved solid electrolytic capacitors comprising conductive polymeric cathodes. More specifically, the present invention is related to improvements in the conductive polymer wherein the improved polymer composition provides improved coverage, particularly on edges and corners, thereby providing a capacitor with improved ESR and improved leakage stability in humid environments.

Solid electrolytic capacitors are widely used throughout the electronics industry. In high voltage applications capacitors with a solid electrolyte, formed by conductive polymer dispersions, give excellent high voltage performance compared to conductive polymer cathodes formed in-situ. These conductive polymer dispersions are prepared by a number of process steps including polymerization, purification, filtration, homogenization, evaporation, etc. Descriptions of these processes are provided in U.S. Pat. Nos. 5,300,575; 7,990,684; 7,270,871; 6,000,840 and 9,030,806; U.S. Patent Publication No. 2011/0049433 and PCT Publication WO 2010/089111 each of which is incorporated herein by reference.

Capacitors and methods of making capacitors are provided in U.S. Pat. Nos. 7,990,683; 7,754,276 and 7,563,290 each of which is incorporated herein by reference.

Solid electrolytic capacitors comprising conducting polymer, as the cathode, have several disadvantages. One disadvantage is the difficulty associated with covering edges and corners of the dielectric. Poor coverage of conducting polymers on corners and edges of anodized anodes results in high DC leakage current and causes reliability problems in humid atmosphere.

Equivalent Series Resistance (ESR) stability of the capacitors requires that the interface between the cathode layer, cathodic conductive layers, conductive adhesive, and leadframe have good mechanical integrity during thermo mechanical stresses. Solid electrolytic capacitors are subject to various thermomechanical stresses during assembly, molding, board mount reflow etc. During board mount the capacitors are subjected to temperatures above 250° C. These elevated temperatures create stresses in the interfaces due to coefficient of thermal expansion (CTE) mismatches between the interfaces. The resultant stress causes mechanical weakening of the interfaces. In some cases this mechanical weakening causes delamination. Any physical separation between the interfaces causes increases in electrical resistance between the interfaces and thus an increased ESR in the finished capacitor. This interfacial weakness also results in higher ESR shift during high humidity environment.

European Patent Application EP-A-1746613 improves the process of forming solid electrolytic capacitor from EP-A-1524678 by virtue of solid particles having a diameter in the range from 0.7 to 20 μm being added to the dispersion. The solid particles are particles of electrically conductive polymer or fillers such as carbonates, silicates, silica, calcium sulphate, barium sulphate, aluminium hydroxide, glass fibres, glass bulbs, wood flour, cellulose powder, carbon black, silicon oxides or silicon dioxide. The patent claims improved edge and corner coverage by addition of the aforementioned particles in conductive polymer polyanion dispersion. However, the solid particles of conductive polymer does not contain polyanion which makes it non-disperive or insoluble in water. Thus, the addition of solid particles of conducting polymer in conducting polymer: polyanion dispersion can affect dispersion stability, causes the dispersion to have a very high viscosity, settlements of solid particles in the dispersion, and results in poor reproducibility in performance. Moreover, as mentioned in US Patent Pub. No. 2015/0140203 A1, the solid particles makes the polymeric outer film brittle, which can cause the outer layer to flake off locally resulting in an increase in the residual current and in the ESR.

To improve coverage without affecting polymeric outer layer film strength, WO2010089111A1, which is incorporated herein by reference, reported the use of a group of chemical compounds, referred to as crosslinkers or primers, which are mostly multi-cationic salts or amines. The crosslinker is applied to the anodized anode prior to the application of polymer slurry to achieve good polymer coverage on corners and edges of the anodized anode. The use of crosslinker eliminated the need of solid particles in conducting polymer dispersion for coverage improvement. The effectiveness of the crosslinker is attributed to the cross-linking ability of multi-cationic salts or amines to the slurry/dispersion particles. While crosslinkers are advantageous for improving the coating coverage on corners and edges of the anodized anode, the addition of these crosslinkers, which are mostly ionic in nature, has the unintended consequences of degrading the performance under humidity such as high ESR shift and increased DC leakage in a finished product.

There was been an ongoing need for an improved conductive polymer capable of achieving better corner and edge coverage in a solid electrolytic capacitor, and process for forming the capacitor, without degrading the ESR and leakage reliability performance in humid conditions.

SUMMARY OF THE INVENTION

It is an object of the present invention to provide an improved conductive polymer capable of providing better corner and edge coverage in capacitor.

It is another object of the present invention to provide an improved capacitor with improved properties, particularly for use in humid condition.

These and other advantages are realized in a process for forming a solid electrolyte capacitor comprising:
providing an anodized anode; and
forming a conductive polymer layer on the anodized anode wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm.

Another embodiment is provided by a solid electrolyte capacitor comprising: an anodized anode and a conductive polymer layer on the anodized anode wherein the conductive polymer layer comprises first particles comprising conductive polymer and polyanion and second particles comprising the conductive polymer and polyanion wherein the first particles have an average particle diameter of at least 1 micron to no more than 10 microns and the second particles have an average particle diameter of at least 1 nm to no more than 600 nm.

Yet another embodiment is provided by a process for forming a dispersion comprising:
providing a monomer and a polyanion in a solution comprising at least 3 wt % to no more than 10 wt % solids of monomer and polyanion; and
polymerization the monomer by high shear polymerization wherein the dispersion comprises first particles comprising conductive polymer and polyanion and second particles comprising the conductive polymer and polyanion wherein the first particles have an average particle diameter of at least 1 micron to no more than 10 microns and the second particles have an average particle diameter of at least 1 nm to no more than 600 nm.

Yet another embodiment is provided in a dispersion comprising:
first particles comprising conductive polymer and polyanion wherein the first particles have an average particle diameter of at least 1 micron to no more than 10 microns; second particles comprising conductive polymer and polyanion wherein the second particles have an average particle diameter of at least 1 nm to no more than 600 nm; wherein the conductive polymer comprises conjugated groups having the structure of Formula I:

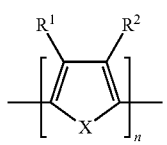

Formula 1 wherein:
$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements;
$R^3$ represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl; and
X is S, N or O; and
the polyanion is represented by Formula 2:

$$A_xB_yC_z \qquad \text{Formula 2}$$

wherein:
A is polystyrenesulfonic acid or salt of polystyrenesulfonate;
B and C separately represent polymerized units substituted with a group selected from:
-carboxyl groups;
—C(O)$OR^6$ wherein $R^6$ is selected from the consisting of:
an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and
—(CHR$^7$CH$_2$O)$_b$—R$^8$ wherein:
$R^7$ is selected from a hydrogen or an alkyl of 1 to 7 carbons;
b is an integer from 1 to the number sufficient to provide a molecular weight of up to 200,000 for the —CHR$^7$CH$_2$O— group; and
$R^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—C(O)—NHR$^9$ wherein:
$R^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—R$^{19}$ wherein:
$R^{19}$ is selected from:
a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
a reactive group selected from the group consisting of hydroxyl, carboxyl, amine, epoxy, silane, imide, amide, thiol, alkene, alkyne, phosphate, azide, acrylate, anhydride and —(O(CHR$^{11}$CH$_2$O)$_d$—R$^{12}$ wherein:
$R^{11}$ is a hydrogen or an alkyl of 1 to 7 carbons;
d is an integer from 1 to the number sufficient to provide a molecular weight of up to 200,000 for the —CHR$^{11}$CH$_2$O— group;
$R^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—O—R$^{13}$ wherein:
$R^{13}$ is selected from:
a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
a reactive group selected from the group consisting of epoxy, silane, alkene, alkyne, acrylate, phosphate and —(CHR$^{14}$CH$_2$O)$_e$—R$^{15}$ wherein:
$R^{14}$ is a hydrogen or an alkyl of 1 to 7 carbons;
e is an integer from 1 to the number sufficient to provide a molecular weight of up to 200,000 for the —CHR$^{14}$CH$_2$O— group; and
$R^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;
x, y and z, taken together are sufficient to form a polyanion with a molecular weight of at least 100 to no more than 500,000;
y/x is 0 to 100; and
z is 0 to a ratio z/x of no more than 100.

Yet another embodiment is provided in a process for forming a solid electrolyte capacitor comprising:
providing an anodized anode; and
forming a conductive polymer layer on the anodized anode wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm wherein the conductive polymer layer comprises an internal polymer layer and an external polymer layer and the internal polymer comprises pre-polymerized conductive polymer.

Yet another embodiment is provided in a process for forming a solid electrolyte capacitor comprising:
providing an anodized anode;
applying a layer comprising an organometallic compound on the anodized anode; and forming a pre-polymerized conductive polymer layer on the organometallic compound layer wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm wherein the conductive polymer layer comprises an internal polymer layer and an external polymer layer.

Yet another embodiment is provided in a process for forming a solid electrolyte capacitor comprising:
providing an anodized anode; and
forming a conductive polymer layer on the anodized anode wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm wherein the forming of the conductive layer comprises applying a dispersion comprising the first particles and the second particles; and wherein a portion of the dispersion is further subjected to rotor-stator high shear mixing, ultrasonic mixing, acoustic mixing, high-pressure homogenizer or a high shearing homogenizer.

Yet another embodiment is provided in a process for forming a solid electrolyte capacitor comprising:
providing an anodized anode; and
forming a conductive polymer layer on the anodized anode wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm wherein the polyanion is represented by Formula 2:

$$A_x B_y C_z \quad \text{Formula 2}$$

wherein:
A is polystyrenesulfonic acid or salt of polystyrenesulfonate;
B and C separately represent polymerized units substituted with a group selected from:
-carboxyl groups;
—C(O)OR$^6$ wherein R$^6$ is selected from the group consisting of:
an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and
—(CHR$^7$CH$_2$O)$_b$—R$^8$ wherein:
R$^7$ is selected from a hydrogen or an alkyl of 1 to 7 carbons;
b is an integer from 1 to the number sufficient to provide a molecular weight of up to 200,000 for the —CHR$^7$CH$_2$O— group; and R$^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—C(O)—NHR$^9$ wherein:
R$^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—R$^{19}$ wherein:
R$^{19}$ is selected from:
a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
a reactive group selected from the group consisting of hydroxyl, carboxyl, amine, epoxy, silane, imide, amide, thiol, alkene, alkyne, phosphate, azide, acrylate, anhydride and —(O(CHR$^{11}$CH$_2$O)$_d$—R$^{12}$ wherein:
R$^{11}$ is a hydrogen or an alkyl of 1 to 7 carbons;
d is an integer from 1 to the number sufficient to provide a molecular weight of up to 200,000 for the —CHR$^{11}$CH$_2$O— group;
R$^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—O—R$^{13}$ wherein:
R$^{13}$ is selected from:
a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
a reactive group selected from the group consisting of epoxy, silane, alkene, alkyne, acrylate, phosphate and
—(CHR$^{14}$CH$_2$O)$_e$—R$^{15}$ wherein:
R$^{14}$ is a hydrogen or an alkyl of 1 to 7 carbons;
e is an integer from 1 to the number sufficient to provide a molecular weight of up to 200,000 for the —CHR$^{14}$CH$_2$O— group; and
R$^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;
x, y and z, taken together are sufficient to form a polyanion with a molecular weight of at least 100 to no more than 500,000;
y/x is 0 to 100; and
z is 0 to a ratio z/x of no more than 100;
wherein the first particles and the second particles are in a dispersion;
wherein a first part of the dispersion is formed by high shear polymerization of a monomer solution and a second part of the dispersion is further subjected to rotor-stator high shear mixing, ultrasonic mixing, acoustic mixing, high-pressure homogenizer or a high shearing homogenizer.

Yet another embodiment is provided in a solid electrolyte capacitor comprising:
an anodized anode; and
a conductive polymer layer on the anodized anode wherein the conductive polymer layer comprises an internal polymer layer and an external polymer layer and further comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm;
wherein the polyanion is represented by Formula 2:

$$A_xB_yC_z \qquad \text{Formula 2}$$

wherein:
A is polystyrenesulfonic acid or salt of polystyrenesulfonate;
B and C separately represent polymerized units substituted with a group selected from:
-carboxyl groups;
—C(O)OR$^6$ wherein R$^6$ is selected from the group consisting of:
an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and
—(CHR$^7$CH$_2$O)$_b$—R$^8$ wherein:
R$^7$ is selected from a hydrogen or an alkyl of 1 to 7 carbons;
b is an integer from 1 to the number sufficient to provide a molecular weight of up to 200,000 for the —CHR$^7$CH$_2$O— group; and
R$^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—C(O)—NHR$^9$ wherein:
R$^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—R$^{19}$ wherein:
R$^{19}$ is selected from:
a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
a reactive group selected from the group consisting of hydroxyl, carboxyl, amine, epoxy, silane, imide, amide, thiol, alkene, alkyne, phosphate, azide, acrylate, anhydride and —(O(CHR$^{11}$CH$_2$O)$_d$—R$^{12}$ wherein:
R$^{11}$ is a hydrogen or an alkyl of 1 to 7 carbons;
d is an integer from 1 to the number sufficient to provide a molecular weight of up to 200,000 for the —CHR$^{11}$CH$_2$O— group;
R$^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—O—R$^{13}$ wherein:
R$^{13}$ is selected from:
a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
a reactive group selected from the group consisting of epoxy, silane, alkene, alkyne, acrylate, phosphate and —(CHR$^{14}$CH$_2$O)$_e$—R$^{15}$ wherein:
R$^{14}$ is a hydrogen or an alkyl of 1 to 7 carbons;
e is an integer from 1 to the number sufficient to provide a molecular weight of up to 200,000 for the —CHR$^{14}$CH$_2$O— group; and R$^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;
x, y and z, taken together are sufficient to form a polyanion with a molecular weight of at least 100 to no more than 500,000;
y/x is 0 to 100; and
z is 0 to a ratio z/x of no more than 100 wherein:
y represents 10 to 30% and z represents 0 to 20% of the sum total of x+y+z; and wherein the external polymer layer comprises the polyanion.

Yet another embodiment is provided in a dispersion comprising:
first particles comprising conductive polymer and polyanion wherein the first particles have an average particle diameter of at least 1 micron to no more than 10 microns; second particles comprising the conductive polymer and the polyanion wherein the second particles have an average particle diameter of at least 1 nm to no more than 600 nm;
wherein the conductive polymer comprises conjugated groups having the structure of Formula I:

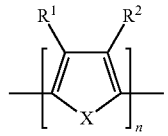

Formula 1 wherein:
R$^1$ and R$^2$ independently represent linear or branched C$_1$-C$_{16}$ alkyl or C$_2$-C$_{18}$ alkoxyalkyl; or are C$_3$-C$_8$ cycloalkyl, phenyl or benzyl which are unsubstituted or substituted by C$_1$-C$_6$ alkyl, C$_1$-C$_6$ alkoxy, halogen or OR$^3$; or R$^1$ and R$^2$, taken together, are linear C$_1$-C$_6$ alkylene which is unsubstituted or substituted by C$_1$-C$_6$ alkyl, C$_1$-C$_6$ alkoxy, halogen, C$_3$-C$_8$ cycloalkyl, phenyl, benzyl, C$_1$-C$_4$ alkylphenyl, C$_1$-C$_4$ alkoxyphenyl, halophenyl, C$_1$-C$_4$ alkylbenzyl, C$_1$-C$_4$ alkoxybenzyl or halobenzyl, 5-, 6-, or 7-membered heterocyclic structure containing two oxygen elements;
R$^3$ represents hydrogen, linear or branched C$_1$-C$_{16}$ alkyl or C$_2$-C$_{18}$ alkoxyalkyl; or are C$_3$-C$_8$ cycloalkyl, phenyl or benzyl which are unsubstituted or substituted by C$_1$-C$_6$ alkyl; and
X is S, N or O; and
the polyanion is represented by Formula 2:

$$A_xB_yC_z \qquad \text{Formula 2}$$

wherein:
A is polystyrenesulfonic acid or salt of polystyrenesulfonate;
B and C separately represent polymerized units substituted with a group selected from:
-carboxyl groups;
—C(O)OR$^6$ wherein R$^6$ is selected from the group consisting of:
an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and
—(CHR$^7$CH$_2$O)$_b$—R$^8$ wherein:
R$^7$ is selected from a hydrogen or an alkyl of 1 to 7 carbons;
b is an integer from 1 to the number sufficient to provide a molecular weight of up to 200,000 for the —CHR$^7$CH$_2$O— group; and $R^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—C(O)—NHR$^9$ wherein:
$R^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—R$^{19}$ wherein:
$R^{19}$ is selected from:
a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
a reactive group selected from the group consisting of hydroxyl, carboxyl, amine, epoxy, silane, imide, amide, thiol, alkene, alkyne, phosphate, azide, acrylate, anhydride and —(O(CHR$^{11}$CH$_2$O)$_d$—R$^{12}$ wherein:
$R^{11}$ is a hydrogen or an alkyl of 1 to 7 carbons;
d is an integer from 1 to the number sufficient to provide a molecular weight of up to 200,000 for the —CHR$^{11}$CH$_2$O— group;
$R^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—O—R$^{13}$ wherein:
$R^{13}$ is selected from:
a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
a reactive group selected from the group consisting of epoxy, silane, alkene, alkyne, acrylate, phosphate and
—(CHR$^{14}$CH$_2$O)$_e$—R$^{15}$ wherein:
$R^{14}$ is a hydrogen or an alkyl of 1 to 7 carbons;
e is an integer from 1 to the number sufficient to provide a molecular weight of up to 200,000 for the —CHR$^{14}$CH$_2$O— group; and
$R^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;
x, y and z, taken together are sufficient to form a polyanion with a molecular weight of at least 100 to no more than 500,000;
y/x is 0 to 100; and
z is 0 to a ratio z/x of no more than 100 wherein a portion of the dispersion is further subjected to rotor-stator high shear mixing, ultrasonic mixing, acoustic mixing, high-pressure homogenizing or high shearing homogenizing.

Yet another embodiment is provided in a process for forming an electrolytic capacitor comprising: providing an anode comprising a dielectric coated with an organometallic compound and forming a first conductive polymer layer comprises a polyanion and a conductive polymer, applying a second polymer slurry comprises a second conductive polymer and polyanion where in the polyanion is PSS copolymer.

Yet another embodiment is provided in a process for forming an electrolytic capacitor comprising: providing an anode comprising a dielectric coated with an organometallic compound and forming a first conductive polymer layer wherein the first conductive polymer layer comprises a polyanion and a conductive polymer, applying a second polymer slurry comprises a polyanion where in the second slurry comprises multimodal particles of PEDOT:Polyanion.

Yet another embodiment is provided in a process for forming an electrolytic capacitor comprising: providing an anode comprising a dielectric coated with an organometallic compound and forming a first conductive polymer layer the first conductive polymer layer comprises a polyanion and a conductive polymer, applying a second polymer slurry comprises a polyanion where in the second slurry comprises at least bimodal particle sizes of PEDOT:Polyanion where in the polyanion is PSS copolymer.

Yet another embodiment is provided in a process for forming an electrolytic capacitor comprising: providing an anode comprising a dielectric coated with an organometallic compound and forming a first conductive polymer layer is a prepolymerized polymer, applying a second polymer slurry comprises a second conductive polymer and polyanion where in the polyanion is PSS copolymer.

Yet another embodiment is provided in a process for forming a solid electrolyte capacitor comprising:
providing an anodized anode; and
forming a conductive polymer layer on the anodized anode wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm wherein the conductive polymer layer comprises an internal polymer layer and an external polymer layer and the internal polymer comprises pre-polymerized conductive polymer.

Yet another embodiment is provided in a process for forming a solid electrolyte capacitor comprising:
providing an anodized anode;
applying a layer comprising an organometallic compound on the anodized anode; and forming a pre-polymerized conductive polymer layer on the organometallic compound layer wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm wherein the conductive polymer layer comprises an internal polymer layer and an external polymer layer.

Yet another embodiment is provided in a process for forming a solid electrolyte capacitor comprising:
providing an anodized anode; and
forming a conductive polymer layer on the anodized anode wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm wherein the forming of the conductive layer comprises applying a dispersion comprising the first particles and the second particles; and wherein a portion of the dispersion is further subjected to rotor-stator high shear mixing, ultrasonic mixing, acoustic mixing, high-pressure homogenizer or a high shearing homogenizer.

Yet another embodiment is provided in a process for forming a solid electrolyte capacitor comprising:
providing an anodized anode; and
forming a conductive polymer layer on the anodized anode wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm wherein the polyanion is represented by Formula 2:

$$A_xB_yC_z \quad \text{Formula 2}$$

wherein:
A is polystyrenesulfonic acid or salt of polystyrenesulfonate;
B and C separately represent polymerized units substituted with a group selected from:
-carboxyl groups;
—C(O)OR$^6$ wherein R$^6$ is selected from the group consisting of:
an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and
—(CHR$^7$CH$_2$O)$_b$—R$^8$ wherein:
R$^7$ is selected from a hydrogen or an alkyl of 1 to 7 carbons;
b is an integer from 1 to the number sufficient to provide a molecular weight of up to 200,000 for the —CHR$^7$CH$_2$O— group; and
R$^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—C(O)—NHR$^9$ wherein:
R$^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—R$^{19}$ wherein:
R$^{19}$ is selected from:
a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
a reactive group selected from the group consisting of hydroxyl, carboxyl, amine, epoxy, silane, imide, amide, thiol, alkene, alkyne, phosphate, azide, acrylate, anhydride and —(O(CHR$^{11}$CH$_2$O)$_d$—R$^{12}$ wherein:
R$^{11}$ is a hydrogen or an alkyl of 1 to 7 carbons;
d is an integer from 1 to the number sufficient to provide a molecular weight of up to 200,000 for the —CHR$^{11}$CH$_2$O— group;
R$^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
—C$_6$H$_4$—O—R$^{13}$ wherein:
R$^{13}$ is selected from:
a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
a reactive group selected from the group consisting of epoxy, silane, alkene, alkyne, acrylate, phosphate and
—(CHR$^{14}$CH$_2$O)$_e$—R$^{15}$ wherein:
R$^{14}$ is a hydrogen or an alkyl of 1 to 7 carbons;
e is an integer from 1 to the number sufficient to provide a molecular weight of up to 200,000 for the —CHR$^{14}$CH$_2$O— group; and
R$^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;
x, y and z, taken together are sufficient to form a polyanion with a molecular weight of at least 100 to no more than 500,000;
y/x is 0 to 100; and
z is 0 to a ratio z/x of no more than 100;
wherein the first particles and second particles are in a dispersion;
wherein a first part of the dispersion is formed by high shear polymerization of a monomer solution and a second part of the dispersion is further subjected to rotor-stator high shear mixing, ultrasonic mixing, acoustic mixing, high-pressure homogenizer or a high shearing homogenizer.

Yet another embodiment is provided in a process for forming a solid electrolyte capacitor comprising:
providing an anodized anode; and
forming a conductive polymer layer on said anodized anode wherein said conductive polymer layer comprises an internal polymer layer and an external polymer layer and further comprises first particles comprising conductive polymer and polyanion and second particles comprising said conductive polymer and said polyanion wherein said first particles have an average particle diameter of at least 1 micron to no more than 10 microns and said second particles have an average particle diameter of at least 1 nm to no more than 600 nm;
wherein said polyanion is represented by Formula 2:

$$A_xB_yC_z \quad \text{Formula 2}$$

wherein:
A is polystyrenesulfonic acid or salt of polystyrenesulfonate;
B and C separately represent polymerized units substituted with a group selected from:
-carboxyl groups;
—C(O)OR$^6$ wherein R$^6$ is selected from the group consisting of:
an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and
—(CHR$^7$CH$_2$O)$_b$—R$^8$ wherein:
R$^7$ is selected from a hydrogen or an alkyl of 1 to 7 carbons;
b is an integer from 1 to the number sufficient to provide a molecular weight of up to 200,000 for the —CHR$^7$CH$_2$O— group; and
R$^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—C(O)—NHR$^9$ wherein:
R$^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
—$C_6H_4$—$R^{19}$ wherein:
$R^{19}$ is selected from:
a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
a reactive group selected from the group consisting of hydroxyl, carboxyl, amine, epoxy, silane, imide, amide, thiol, alkene, alkyne, phosphate, azide, acrylate, anhydride and —$(O(CHR^{11}CH_2O)_d$—$R^{12}$ wherein:
$R^{11}$ is a hydrogen or an alkyl of 1 to 7 carbons;
d is an integer from 1 to the number sufficient to provide a molecular weight of up to 200,000 for the —$CHR^{11}CH_2O$— group;
$R^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
—$C_6H_4$—O—$R^{13}$ wherein:
$R^{13}$ is selected from:
a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
a reactive group selected from the group consisting of epoxy, silane, alkene, alkyne, acrylate, phosphate and
—$(CHR^{14}CH_2O)_e$—$R^{15}$ wherein:
$R^{14}$ is a hydrogen or an alkyl of 1 to 7 carbons;
e is an integer from 1 to the number sufficient to provide a molecular weight of up to 200,000 for the —$CHR^{14}CH_2O$— group; and
$R^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;
x, y and z, taken together are sufficient to form a polyanion with a molecular weight of at least 100 to no more than 500,000;
y/x is 0 to 100; and
z is 0 to a ratio z/x of no more than 100 wherein:
y represents 10 to 30% and z represents 0 to 20% of the sum total of x+y+z; and wherein the external polymer layer comprises the polyanion.

Yet another embodiment is provided in a capacitor comprising:
an anodized anode; and a conductive polymer layer on the anodized anode wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm wherein the conductive polymer layer comprises an internal polymer layer and an external polymer layer and the internal polymer comprises pre-polymerized conductive polymer.

Yet another embodiment is provided in a capacitor comprising:
an anodized anode;
a layer comprising an organometallic compound on the anodized anode; and a conductive polymer layer on the organometallic compound layer wherein the conductive polymer layer comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm wherein the conductive polymer layer comprises an internal polymer layer and an external polymer layer.

Yet another embodiment is provided in a capacitor comprising:
an anodized anode; and
a conductive polymer layer on the anodized anode wherein the conductive polymer layer comprises an internal polymer layer and an external polymer layer and further comprises first particles comprising conductive polymer and polyanion and second particles comprising the conductive polymer and the polyanion wherein the first particles have an average particle diameter of at least 1 micron to no more than 10 microns and the second particles have an average particle diameter of at least 1 nm to no more than 600 nm;
wherein the polyanion is represented by Formula 2:

$$A_xB_yC_z \quad \text{Formula 2}$$

wherein:
A is polystyrenesulfonic acid or salt of polystyrenesulfonate;
B and C separately represent polymerized units substituted with a group selected from:
-carboxyl groups;
—$C(O)OR^6$ wherein $R^6$ is selected from the group consisting of:
an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and
—$(CHR^7CH_2O)_b$—$R^8$ wherein:
$R^7$ is selected from a hydrogen or an alkyl of 1 to 7 carbons;
b is an integer from 1 to the number sufficient to provide a molecular weight of up to 200,000 for the —$CHR^7CH_2O$— group; and
$R^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—$C(O)$—$NHR^9$ wherein:
$R^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
—$C_6H_4$—$R^{19}$ wherein:
$R^{19}$ is selected from:
a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
a reactive group selected from the group consisting of hydroxyl, carboxyl, amine, epoxy, silane, imide, amide, thiol, alkene, alkyne, phosphate, azide, acrylate, anhydride and —$(O(CHR^{11}CH_2O)_d$—$R^{12}$ wherein:
$R^{11}$ is a hydrogen or an alkyl of 1 to 7 carbons;
d is an integer from 1 to the number sufficient to provide a molecular weight of up to 200,000 for the —$CHR^{11}CH_2O$— group;

$R^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
—$C_6H_4$—O—$R^{13}$ wherein:
$R^{13}$ is selected from:
a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
a reactive group selected from the group consisting of epoxy, silane, alkene, alkyne, acrylate, phosphate and
—$(CHR^{14}CH_2O)_e$—$R^{15}$ wherein:
$R^{14}$ is a hydrogen or an alkyl of 1 to 7 carbons;
e is an integer from 1 to the number sufficient to provide a molecular weight of up to 200,000 for the —$CHR^{14}CH_2O$— group; and
$R^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;
x, y and z, taken together are sufficient to form a polyanion with a molecular weight of at least 100 to no more than 500,000;
y/x is 0 to 100; and
z is 0 to a ratio z/x of no more than 100 wherein:
y represents 10 to 30% and z represents 0 to 20% of the sum total of x+y+z; and wherein the external polymer layer comprises the polyanion.

Yet another embodiment is provided in a dispersion comprising:
first particles comprising conductive polymer and polyanion wherein the first particles have an average particle diameter of at least 1 micron to no more than 10 microns; second particles comprising the conductive polymer and the polyanion wherein the second particles have an average particle diameter of at least 1 nm to no more than 600 nm;
wherein the conductive polymer comprises conjugated groups having the structure of Formula I:

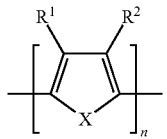

Formula 1 wherein:
$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements;
$R^3$ represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl; and
X is S, N or O; and
the polyanion is represented by Formula 2:

$A_xB_yC_z$      Formula 2 wherein:
A is polystyrenesulfonic acid or salt of polystyrenesulfonate;
B and C separately represent polymerized units substituted with a group selected from:
-carboxyl groups;
—$C(O)OR^6$ wherein $R^6$ is selected from the group consisting of:
an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and
—$(CHR^7CH_2O)_b$—$R^8$ wherein:
$R^7$ is selected from a hydrogen or an alkyl of 1 to 7 carbons;
b is an integer from 1 to the number sufficient to provide a molecular weight of up to 200,000 for the —$CHR^7CH_2O$— group; and
$R^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
—$C(O)$—$NHR^9$ wherein:
$R^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
—$C_6H_4$—$R^{19}$ wherein:
$R^{19}$ is selected from:
a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
a reactive group selected from the group consisting of hydroxyl, carboxyl, amine, epoxy, silane, imide, amide, thiol, alkene, alkyne, phosphate, azide, acrylate, anhydride and —$(O(CHR^{11}CH_2O)_d$—$R^{12}$ wherein:
$R^{11}$ is a hydrogen or an alkyl of 1 to 7 carbons;
d is an integer from 1 to the number sufficient to provide a molecular weight of up to 200,000 for the —$CHR^{11}CH_2O$— group;
$R^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
—$C_6H_4$—O—$R^{13}$ wherein:
$R^{13}$ is selected from:
a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
a reactive group selected from the group consisting of epoxy, silane, alkene, alkyne, acrylate, phosphate and
—$(CHR^{14}CH_2O)_e$—$R^{15}$ wherein:
$R^{14}$ is a hydrogen or an alkyl of 1 to 7 carbons;
e is an integer from 1 to the number sufficient to provide a molecular weight of up to 200,000 for the —$CHR^{14}CH_2O$— group; and
$R^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;

x, y and z, taken together are sufficient to form a polyanion with a molecular weight of at least 100 to no more than 500,000;

y/x is 0 to 100; and z is 0 to a ratio z/x of no more than 100 wherein a portion of the dispersion is further subjected to rotor-stator high shear mixing, ultrasonic mixing, acoustic mixing, high-pressure homogenizing or high shearing homogenizing.

DETAILED DESCRIPTION OF THE INVENTION

Figure 1:
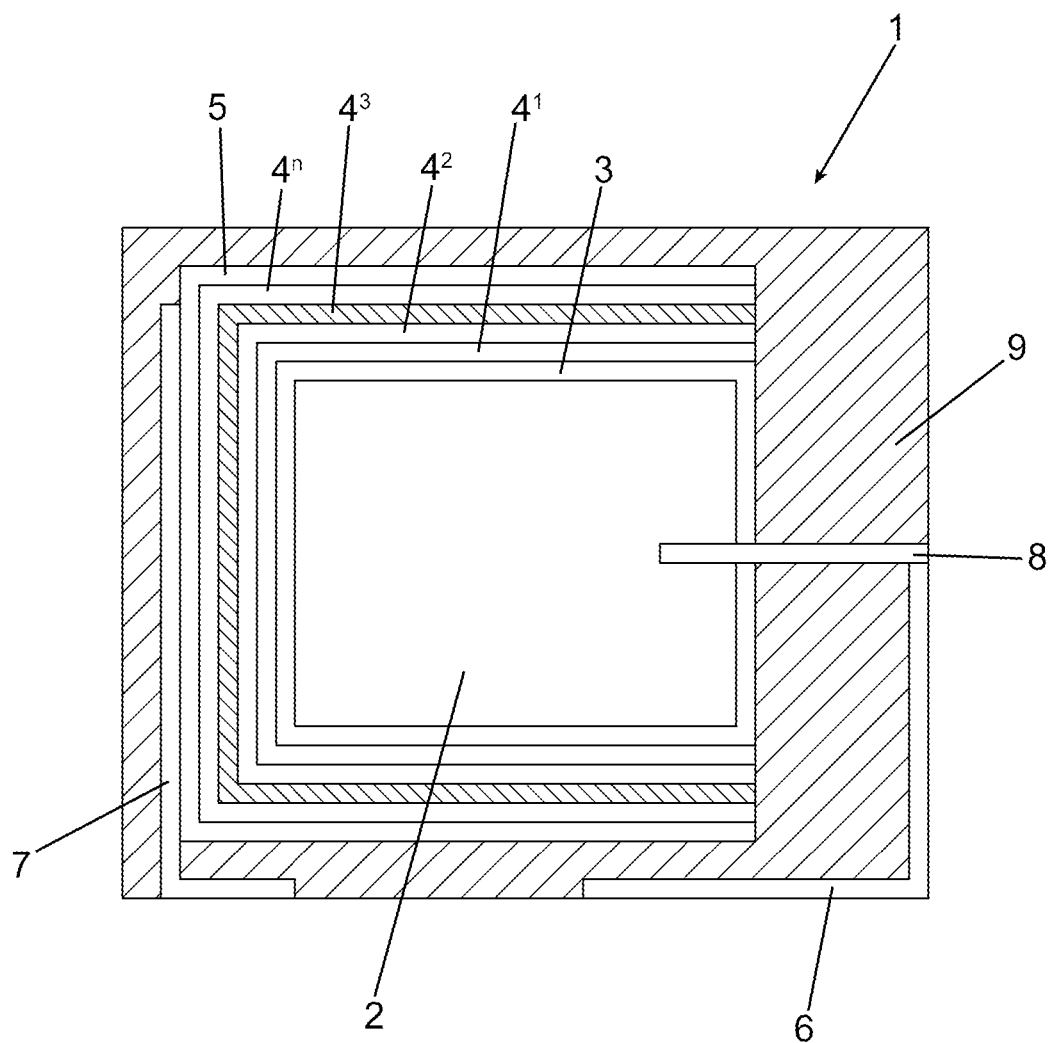
FIG. 1 is a schematic cross-sectional view of a solid electrolytic capacitor.

The present invention is related to an improved conductive polymer dispersion for use in solid electrolyte capacitors, an improved solid electrolyte capacitor comprising the conductive polymer as a cathode, a slurry comprising the conductive polymer, and a method for making the improved solid electrolyte capacitor. More particularly, the present invention is related to an improved polymerization method for conductive polymer dispersions suitable for use in an improved solid electrolyte capacitor wherein the improvement arises, at least in part, by improved corner and edge coverage on the anodized anode and improved interfacial adhesion in cathode layers.

It has been found that, surprisingly, complete corner and edge coverage and improved interfacial adhesion in a solid electrolyte capacitor can be achieved by applying a mixture comprising a dispersion of conductive polymer with at least a bimodal size distribution of a conductive polymer:polyanion complex particles in a solvent. The first particles have a median particle size ($D_{50}$) which is at least 1 micron to no more than 10 microns. More preferably, the first particles have a $D_{50}$ which is at least 1 micron to no more than 5 microns and even more preferably at least 2 microns to no more than 4 microns. The second particles have a $D_{50}$ of at least 1 nm to no more than 600 nm more preferably at least 100 nm to no more than 500 nm and even more preferably at least 200 nm to no more than 400 nm. The term average diameter, reported as $D_{50}$, is the mass-median diameter or average particle diameter by mass. While being described as bi-modal dispersion having more than two distinct particle sizes are contemplated.

It is preferred that the particles of polymer and anion have at least 5 wt % to no more than 95 wt % first particles with a $d_{50}$ of at least 1 micron to no more than 10 microns, more preferably at least 25 wt % to no more than 75 wt % and even more preferably at least 40 wt % to no more than 60 wt %. It is also preferred that the particles of polymer and anion have at least 5 wt % to no more than 95 wt % second particles with a $d_{50}$ of at least 1 nm to no more than 600 nm, more preferably at least 25 wt % to no more than 75 wt % and even more preferably at least 40 wt % to no more than 60 wt %.

It has been found, surprisingly, the ratio adjustment of first particles and second particles in conducting polymer dispersion through post processing a part of dispersion impact polyer film quality. The post processing techniques can be high shear mixing, ultrasonic mixing, acoustic mixing, high-pressure homogenizing or high shearing homogenizing mixing. The at least bimodal size distribution of conductive polymer:polyanion particles leads to significantly improved corner and edge coverage compared to prior art dispersions with monomodal particle size distribution. The result is a solid electrolytic capacitor with significantly improved ESR and improved leakage reliability in humid conditions. The present invention provides for a solid electrolytic capacitor with an ESR shift of less than 100% and a leakage of less than 0.1 CV after 1000 hrs load at 85° C. and 85% relative humidity.

In a particularly preferred embodiment the internal polymer layer comprises smaller particles and the external polymer layer comprises an at least bimodal size distribution of conductive polymer:polyanion particles.

The invention will be described with reference to the figures forming an integral, non-limiting element of the disclosure.

A capacitor of the invention will be described with reference to FIG. 1 wherein a solid electrolytic capacitor is illustrated in cross-sectional schematic view. In FIG. 1, the solid electrolytic capacitor, 1, comprises an anode, 2, with a dielectric, 3, thereon. After completion the conductive polymeric layer, 4, is essentially a continuous preferably unstriated layer, formed by multiple process steps and will therefore be described herein with each layer discussed separately for the purposes of illustration and clarity. It is well known that attaching a lead to a conductive polymer layer is difficult and it is therefore standard in the art to apply an attachment layer, 5, typically comprising layers containing conductive carbon on the conductive polymer layer and silver containing layers on the carbon containing layer. A cathode lead, 7, is attached to the attachment layer by a conductive adhesive. An anode lead, 6, is attached to a lead wire, 8, typically by welding and the entire assembly, except for portions of the cathode lead and anode lead, are encapsulated in a non-conductive material, 9, such as a resin.

The first conductive polymer layer, $4^1$, applied is referred to as an internal polymer layer and is formed in a manner sufficient to allow the interstitial areas of the porous dielectric to be adequately coated. The first conductive polymer layer typically comprises sublayers which are formed sequentially preferably from common components and under common conditions suitable to coat the interstitial areas of the porous dielectric. The first conductive polymer layer typically comprises 1 to 5 layers with each containing a conjugated conductive polymer.

The first conductive polymer layer can have the same conductive polymer and polyanion as subsequent layers, however, the first conductive polymer layer is preferably formed by at least one application of a conductive polymer formed by in-situ polymerization formed from solutions of monomer(s), oxidant and dopant(s) or by at least one application of a conductive polymer solution or dispersion having small average particle sizes thereby allowing for adequate penetration. In one embodiment the internal polymer layer is formed from a dispersion comprising particles of conductive polymer and polyanion wherein the particle size a $D_{50}$ of 10 to 50 nm. More preferably the internal polymer has particle size with a $D_{50}$ of 10 to 30 nm and more preferably 10-20 nm. In one embodiment the internal polymer layer is free of in-situ polymerized conducting polymer.

The internal polymer layer may further coated on adhesion promoting layer to improve adhesion between dielectric and conducting polymer layer. The examples of adhesion promoter such as organometallic compounds or organofunctional silanes or hydrolyzates or organofunctional silanes containing weak acid, phosphates thereof, e.g. 3-glycidoxypropyl-trialkoxysilane, 3-aminopropyltriethoxysilane, 3-mercaptopropyltrimethoxysilane, 3-methacryloyloxy-propyltrimethoxysilane; vinyltrichlorosilane, vinyl(β-methoxysilane), vinyltriethoxysilane, γ-methacryloxysilane, β-(3,4-epoxycyclohexyl)ethyltrimethoxysilane, γ-glycidoxypropyltrimethoxysilane, N-β-(aminoethyl)-γ-aminopropylmethyldimethoxysilane, N-β-(aminoethyl)-γ-aminopropyltrimethoxysilane, γ-aminopropyltriethoxysilane, N-phenyl-γ-aminopropyltrimethoxysilane, γ-mercaptopropyltrimethoxysilane, γ-chloropropyltrimethoxysilane, or the like. or water soluble monomers/oligomers/polymers containing reactive groups such as acid, alcohol, phenol, amines, epoxy, acrylates etc. Example of The weak acid in organofunctional silanes can be acetic acid, phosphoric acid, or the like. The internal polymer layer may further comprise small molecular or polymeric counterions including the polyanion described elsewhere herein. In one embodiment the organometallic compound is applied to the dielectric, or the surface of the anodized anode, and the internal polymer layer is formed thereon. In another embodiment the organometallic compound is applied between layers of conductive polymer.

Subsequent conductive polymer sub-layers, $4^2$-$4^n$, wherein n is up to about 10, are referred to collectively as the external polymer layer, typically applied in the form of a dispersion or solution, wherein the conductive polymer containing dispersion or solution used to form each sub-layer may be the same or different thereby resulting in layers which are compositionally the same or different with a preference for commonality for manufacturing convenience. At least one external layer comprises the inventive polymer dispersion and preferably each of the external layers comprises the inventive polymer dispersion. In one embodiment the external layers are free of in-situ polymerized conducting polymer.

The external layers may also independently comprise surface-active substances, for example ionic and/or nonionic surfactants; adhesion promoters, for example organofunctional silanes or hydrolyzates, phosphates thereof, e.g. 3-glycidoxypropyl-trialkoxysilane, 3-aminopropyltriethoxysilane, 3-mercaptopropyltrimethoxysilane, 3-methacryloyloxy-propyltrimethoxysilane, vinyltrimethoxysilane or octyltriethoxysilane, polyurethanes, polyacrylates or polyolefin dispersions, or further additives.

The external layers may further independently comprise additives which enhance the conductivity, for example compounds containing ether groups, for example tetrahydrofuran; compounds containing lactone groups, such as γ-butyrolactone, valerolactone; compounds containing amide or lactam groups, such as caprolactam, N-methylcaprolactam, N,N-dimethylacetamide, N-methyl-acetamide, N,N-dimethylformamide (DMF), N-methyl-formamide, N-methylformanilide, N-methylpyrrolidone (NMP), N-octylpyrrolidone, pyrrolidone; sulfones and sulfoxides, for example sulfolane (tetramethylenesulfone), dimethyl sulfoxide (DMSO); sugars or sugar derivatives, for example sucrose, glucose, fructose, lactose, sugar alcohols, for example sorbitol, mannitol; imides, for example succinimide or maleimide; furan derivatives, for example 2-furancarboxylic acid, 3-furancarboxylic acid, and/or di- or polyalcohols, for example ethylene glycol, glycerol or di- or triethylene glycol. Preference is given to using, as conductivity-enhancing additives, ethylene glycol, dimethyl sulfoxide, glycerol or sorbitol.

The external polymer layers may have a primer or cross liker layer between adjacent conductive polymer sub-layers to improve inter-layer adhesion. In a preferred embodiment conductive polymer sub-layers $4^2$-$4^n$ are deposited primer or cross-linker without a primer there between. The examples of primer compound are mono amine or diamime compounds such as comprising at least amine groups and, in one embodiment, preferably at least 2 amine groups. Diamines which are particularly suitable amines are listed in U.S. Pat. No. 8,882,856, which is incorporated herein by reference. Specifically preferred amines include crosslinkers which comprise at least one diamine, triamine, oligoamine or polymeric amine or derivatives thereof including the following amines: aliphatic amines, particularly aliphatic .alpha., .OMEGA.-diamines such as 1,4-diaminocyclohexane or 1,4-bis(amino-methyl)cyclohexane; linear aliphatic .alpha., .OMEGA.-diamines such as ethylenediamine, 1,6-hexanediamine, 1,7-heptanediamine, 1,8-octanediamine, 1,9-nonanediamine, 1,10-decanediamine or 1,12-dodecanediamine; derivatives of aliphatic .alpha., .OMEGA.-diamines such as N,N-dimethylethylenediamine, N,N,N',N'-tetramethylethylenediamine, N,N,N',N'-tetramethyl-1,4-butanediamine, N,N,N,N',N',N'-hexamethylhexamethylene-diammonium dibromide, piperazine, 1,4-diazabicyclo[2.2.2]octane, N,N,N',N'-tetrakis(2-hydroxypropyl)ethylenediamine, N-[3-(trimethoxysilyl)propyl]ethylenediamine, or 1,4-bis(3-aminopropyl)piperazine; amides such as N,N'-diacetyl-1,6-hexanediamine, N,N,N',N'-tetraacetylethylene-diamine, 1,4-diformylpiperazines or N,N'-ethylenebis(stearamide); aliphatic amines having at least three amino groups such as 1,4-bis(3-aminopropyl)piperazine; linear aliphatic amines having at least three amino groups such as N-(6-aminohexyl)-1,6-diaminohexane or N-(3-aminopropyl)-1,4-diaminobutane; derivatives of linear aliphatic amines having at least three amino groups such as 3-[2-(2-aminoethylamino) ethylamino]propyltrimethoxysilane; aromatic amines having at least two amino groups, organofunctional silane containing amino groups such as 3-aminopropyltriethoxysilane. The prime compound may further comprises strong or weak acid as counter ion such as p-toluenesulfonic acid, acetic acid, phosphoric acid.

The conductive polymers is selected from the group consisting of polyanilines, polypyrroles and polythiophenes each of which may be substituted. A particularly preferred polymer comprises conjugated groups having the structure of Formula 1:

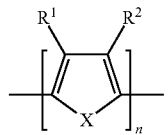

Formula 1 wherein:

$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R^3$ preferably represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl;

X is S, N or O and most preferable X is S;

$R^1$ and $R^2$ of Formula 1 are preferably chosen to prohibit polymerization at the β-site of the ring as it is most preferred that only α-site polymerization be allowed to proceed; it is more preferred that $R^1$ and $R^2$ are not hydrogen and more preferably, $R^1$ and $R^2$ are α-directors with ether linkages being preferable over alkyl linkages; it is most preferred that the $R^1$ and $R^2$ are small to avoid steric interferences.

In a particularly preferred embodiment the $R^1$ and $R^2$ of Formula I are taken together to represent —O—(CHR$^4$)$_n$—O— wherein:

n is an integer from 1 to 5 and most preferably 2;

$R^4$ is independently selected from hydrogen; a linear or branched $C_1$ to $C_{18}$ alkyl radical $C_5$ to $C_{12}$ cycloalkyl radical, $C_6$ to $C_{14}$ aryl radical $C_7$ to $C_{18}$ aralkyl radical or $C_1$ to $C_4$ hydroxyalkyl radical, optionally substituted with a functional group selected from carboxylic acid, hydroxyl, amine, substituted amines, alkene, acrylate, thiol, alkyne, azide, sulfate, sulfonate, sulfonic acid, imide, amide, epoxy, anhydride, silane, and phosphate; hydroxyl radical; or $R^4$ is selected from —(CHR$^5$)$_a$—R$^{16}$; —O(CHR$^5$)$_a$R$^{16}$; CH$_2$O(CHR$^5$)$_a$R$^{16}$; —CH$_2$O(CH$_2$CHR$^5$O)$_a$R$^{16}$, or $R^4$ is a functional group selected from the group consisting of hydroxyl, carboxyl, amine, epoxy, amide, imide, anhydride, hydroxymethyl, alkene, thiol, alkyne, azide, sulfonic acid, benzene sulfonic acidsulfate, SO$_3$M, anhydride, silane, acrylate and phosphate; $R^5$ is H or alkyl chain of 1 to 5 carbons optionally substituted with a functional groups selected from carboxylic acid, hydroxyl, amine, alkene, thiol, alkyne, azide, epoxy, acrylate and anhydride;

$R^{16}$ is H or SO$_3$M or an alkyl chain of 1 to 5 carbons optionally substituted with a functional groups selected from carboxylic acid, hydroxyl, amine, substituted amines, alkene, thiol, alkyne, azide, amide, imide, sulfate, SO$_3$M, amide, epoxy, anhydride, silane, acrylate and phosphate;

a is integer from 0 to 10; and

M is a H or cation preferably selected from ammonia, sodium or potassium.

The conducting polymer can be either a water-soluble or water-dispersible compound. Examples of such a π conjugated conductive polymer include polypyrrole or polythiophene. Particularly preferred conductive polymers include poly(3,4-ethylenedioxythiophene), poly(4-(2,3-dihydrothieno-[3,4-b][1,4]dioxin-2-yl)methoxy)-1-butane-sulphonic acid, salt), poly(4-(2,3-dihydrothieno-[3,4-b][1,4]dioxin-2-yl)methoxy)-1-propane-sulphonic acid, salt), poly(4-(2,3-dihydrothieno-[3,4-b][1,4]dioxin-2-yl)methoxy)-1-methyl-1-propane-sulphonic acid, salt), poly(4-(2,3-dihydrothieno-[3,4-b][1,4]dioxin-2-yl)methoxy alcohol, poly(N-methylpyrrole), poly(3-methylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), polythiophene, poly(3-methylthiophene), poly(3-hexylthiophene), poly(3-heptylthiophene), poly(3-octylthiophene), poly(3-decylthiophene), poly(3-dodecylthiophene), poly(3-ociadecylthiophene), poly(3-bromothiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-ethylenedioxythiophene), poly(3,4-propylenedioxythiophene), poly(3,4-butenedioxythiophene), poly(3-carboxythiophene), poly(3-methyl-4-carboxythiophene), poly(3-methyl-4-carboxyeihylthiophene), poly(3-methyl-4-carboxybutylihiophene), polyaniline, poly(2-methylaniline), poly(3-isobutylaniline), poly(2-aniline sulfonate), poly(3-aniline sulfonate), and the like.

Co-polymers composed at least two different copolymerized monomers are contemplated. Co-polymers comprise at least one polymerized monomer selected from the group consisting of polypyrrole, polythiophene, poly(4-(2,3-dihydrothieno-[3,4-b][1,4]dioxin-2-yl)methoxy)-1-butane-sulphonic acid, salt), poly(4-(2,3-dihydrothieno-[3,4-b][1,4]dioxin-2-yl)methoxy)-1-methyl-1-propane-sulphonic acid, salt), poly(N-methylpyrrole), poly(3-methylthiophene), poly(3-methoxythiophene), and poly(3,4-ethylenedioxythiophene).

A particularly preferred polymer is poly-3,4-polyethylene dioxythiophene (PEDOT).

The polyanion in at least bimodal conductive particles is a homopolymer of polystyrenesulfonic acid or salt of polystyrenesulfonate, and/or random copolymer comprising groups A, B and C represented by the ratio of Formula 2:

$$A_xB_yC_z \qquad \text{Formula 2}$$

wherein:

A is polystyrenesulfonic acid or salt of polystyrenesulfonate;

B and C separately represent polymerized units substituted with a group selected from:

-Carboxyl groups;

—C(O)OR$^6$ wherein R$^6$ is selected from the group consisting of:

an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and (CHR$^7$CH$_2$O)$_b$—R$^8$ wherein:

R$^7$ is selected from a hydrogen or an alkyl of 1 to 7 carbons and preferably hydrogen or methyl;

b is an integer from 1 to the number sufficient to provide a molecular weight of up to 200,000 for the —CHR$^7$CH$_2$O— group; and R$^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;

—C(O)—NHR$^9$ wherein:

R$^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;

—C$_6$H$_4$—R$^{19}$ wherein:

R$^{19}$ is selected from:

a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;

a reactive group selected from the group consisting of hydroxyl, carboxyl, amine, epoxy, silane, imide, amide, thiol, alkene, alkyne, phosphate, azide, acrylate, anhydride and —(O(CHR$^{11}$CH$_2$O)$_d$—R$^{12}$ wherein:

R$^{11}$ is a hydrogen or an alkyl of 1 to 7 carbons and preferably hydrogen or methyl;

d is an integer from 1 to the number sufficient to provide a molecular weight of up to 200,000 for the —CHR$^{11}$CH$_2$O— group;

R$^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;

—C$_6$H$_4$—O—R$^{13}$ wherein:

R$^{13}$ is selected from:

a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;

a reactive group selected from the group consisting of epoxy, silane, alkene, alkyne, acrylate, phosphate and —(CHR$^{14}$CH$_2$O)$_e$—R$^{15}$ wherein:

R$^{14}$ is a hydrogen or an alkyl of 1 to 7 carbons and preferably hydrogen or methyl;

e is an integer from 1 to the number sufficient to provide a molecular weight of up to 200,000 for the —CHR$^{14}$CH$_2$O— group; and R$^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;

x, y and z, taken together are sufficient to form a polyanion with a molecular weight of at least 100 to no more than 500,000 and y/x is 0 to 100 more preferably 0.01 to 100; z is 0 to a ratio z/x of no more than 100; more preferably x represents 50-99%, y represents 1 to 50% and z represents 0 to 49% of the sum total of x+y+z; even more preferably x represents 70-90%; y represents 10 to 30% and z represents 0 to 20% of the sum total of x+y+z.

A particular feature of the instant invention is the ability to adjust the ratio of conductive polymer to polyanion for the different particle sizes due to the difference in surface area and size. It is preferred that the molar ratio of conductive polymer to polyanion for each of the smaller particle size portion and the larger size portion be in the range of 1:0.1 to 0.1:1, more preferably 1:1 to 0.2:1 and even more preferably 0.8:1 to 0.25:1. In an embodiment the molar ratio of conductive polymers to polyanion is higher for the first particles, having a larger average diameter, than in the second particles having the smaller average diameter. More preferably, the molar ratio of conductive polymers to polyanion is 10% larger for the smaller particle size portion than in the larger particle size portion. Without being limited to theory, the increased molar ratio for the smaller particle sizes improves the interparticle packing in the coating thereby improving the quality of the coating, particularly, on the edges and corners.

Another particular feature of the invention is the ability to adjust the molecular weight of the polyanion for the two portions of the dispersion having different particle sizes. The preferred molecular weight of polyanion for each of the smaller particle size portion of the dispersion and the larger particle size portion of the dispersion is at least about 600 to no more than about 500,000. In an embodiment the polyanion can have a different molecular weight for the large particle size portion than for the small particle size portion.

The dispersion of particles of conductive polymer and polyanion having multiple particle sizes is preferably formed by high shear polymerization with a rotor-stator system at high solids content such as above about 3 wt % of mixture of monomer and polyanion. While not limited to theory it is hypothesized that a combination of the monomer concentration and high shear kinetics facilitates the growth of particles having a mixture of particle sizes. High shear rotor-stator polymerization is described in U.S. Pat. No. 9,030,806 which is incorporated herein by reference. In one embodiment a portion of the dispersion is further subjected to rotor-stator high shear mixing, ultrasonic mixing, acoustic mixing, high-pressure homogenizer or a high shearing homogenizer.

However, the preparation of dispersion with particles of conductive polymer and polyanion having a mixture of sizes may be prepared by other methods, including mixing, and may not be limited to high shear rotor-stator polymerization.

A particular feature of the inventive dispersion is the decreased viscosity relative to monomodal dispersions at a given percent solids loading for the dispersion. The lower viscosity, at higher solids content, improves the coating quality especially at the edges and corners of the anodized anode. The inventive dispersion with multiple particle sizes has a viscosity of at least 2000 cP at 6 rpm to no more than 5000 cP at 6 rpm when polymerized at 3.56% solids input of mixture of monomer and polyanion during polymerization. With monomodal sized particles the viscosity is above 6000 cP at 6 rpm when polymerized with 2.1% solids input of monomer and polyanion and increases with increased % solids input. The ability to apply a dispersion with higher percent solids at low viscosity is advantageous for improved coating quality.

The dispersion of conducting polymer with an at least bimodal particle size distribution may further comprise a polymeric dopant. A preferred polymeric dopant is polystyrene sulfonate (PSS). Polystyrene sulfonic acid (PSSA) copolymer is a particularly preferred dopant particularly as a copolymer with polyethylene glycol monoacrylate.

The conductive polymer solution or dispersion preferably comprises reactive monomers as film formers which can improve polymer film strength upon drying of the film. The reactive monomer or oligomers can be soluble in water or organic solvent or disperse in water through the use of ionic/non-ionic surfactants. The reactive monomers can have average functionalities of at least two or more. The curing process of the monomer can be catalyzed by using heat, radiation or chemical catalysis. Exemplary monomers include compounds having more than one epoxy group includes ethylene glycol diglycidyl ether (EGDGE), propylene glycol diglycidyl ether (PGDGE), 1,4-butanediol diglycidyl ether (BDDGE), pentylene glycol diglycidyl ether, hexylene glycol diglycidyl ether, cyclohexane dimethanol diglycidyl ether, resorcinol glycidyl ether, glycerol diglycidyl ether (GDGE), glycerol polyglycidyl ethers, diglycerol polyglycidyl ethers, trimethylolpropane polyglycidyl ethers, sorbitol diglycidyl ether (Sorbitol-DGE), sorbitol polyglycidyl ethers, polyethylene glycol diglycidyl ether (PEGDGE), polypropylene glycol diglycidyl ether, polytetramethylene glycol diglycidyl ether, di(2,3-epoxypropyl) ether, 1,3-butadiene diepoxide, 1,5-hexadiene diepoxide, 1,2,7,8-diepoxyoctane, 1,2,5,6-diepoxycyclooctane, 4-vinyl cyclohexene diepoxide, bisphenol A diglycidyl ether, maleimide-epoxy compounds, diglycidyl ether, glycidyl acrylate, glycidyl methacrylate, bisphenol A epoxy, epoxidized Bisphenol A novolac modified epoxy, urethane modified Bisphenol A epoxy, an epoxidized o-cresylic novolac and so forth.

Additional film formers are monomers containing acidic groups. Exemplary acidic monomers include: oxalic acid, malonic acid, succinic acid, glutaric acid, adipic acid, pimelic acid, suberic acid, azelaic acid, sebacic acid, dodecanedioic acid, phthalic acids, maleic acid, muconic acid, citric acid, trimesic acid, polyacrylic acid, etc. Particularly preferred organic acids are aromatic acid such as phthalic acid, and particularly ortho-phthalic acid.

Film forming monomers containing alcohol/acrylate groups can be employed. Exemplary monomers include: diethylene glycol, pentaerythritol, triethylene glycol, oligo/polyethylene glycol, triethylene glycol monochlorohydrin, diethylene glycol monochlorohydrin, oligo ethylene glycol monochlorohydrin, triethylene glycol monobromohydrin, diethylene glycol monobromohydrin, oligo ethylene glycol monobromohydrin, polyethylene glycol, polyether, polyethylene oxide, triethylene glycol-dimethylether, tetraethylene glycol-dimethylether, diethylene glycol-dimethylether, diethylene glycol-diethylether-diethylene glycol-dibutylether, dipropylene glycol, tripropylene glycol, polypropylene glycol, polypropylene dioxide, polyoxyethylene alkylether, polyoxyethylene glycerin fatty acid ester, polyoxyethylene fatty acid amide, 2-hydroxyethyl methacrylate, 2-hydroxypropyl methacrylate, n-butoxyethyl methacrylate, n-butoxyethylene glycol methacrylate, methoxytriethylene glycol methacrylate, methoxypolyethylene glycol methacrylate, 2-hydroxyethyl acrylate, 2-hydroxypropyl acrylate, n-butoxyethyl acrylate, n-butoxyethylene glycol acrylate, methoxytriethylene glycol acrylate, methoxypolyethylene glycol acrylate, and the like; bifunctional (meth)acrylate compounds, such as, ethylene glycol di(meth)acrylate, diethylene glycol di(meth)acrylate, triethylene glycol di(meth)acrylate, polyethylene glycol di(meth)acrylate, neopentyl glycol di(meth)acrylate, glycerin di(meth)acrylate, and the like; glycidyl ethers, such as, ethylene glycol diglycidyl ether, glycidyl ether, diethylene glycol diglycidyl ether, triethylene glycol diglycidyl ether, polyethylene glycol diglycidyl ether, propylene glycidyl ether, tripropylene glycidyl ether, polypropylene glycidyl ether, glycerin diglycidyl ether, and the like; glycidyl methacrylate, trimethylolpropane triacrylate, ethylene oxide-modified trimethylolpropane triacrylate, ethylene oxide-modified pentaerythritol triacrylate, ethylene oxide-modified pentaerythritol tetraacrylate, and the like.

The external polymer layers may also independently comprise film forming polyanions containing reactive groups such as epoxy, alcohol, silanes, phosphates, amine, alkene, thiol, alkyne, azide carboxylic acid.

The external polymer layers may also independently comprise, as film formers, linear hyperbranched polymers described in U.S. Pat. No. 9,378,898. The external polymer layer may comprise a linear-hyperbranched polymer where the linear block has at least two reactive end functional groups selected from hydroxyl groups, amino groups, epoxy, acrylate, acid etc. and where the hyper-branched block comprises polyether-epoxy, polyester-epoxy, polyester-silanol, polyester-acid, polyether-alcohol, polyimide-acid, polyether-acrylate, polyether-silanol and polyester-amine pendant groups.

The external polymer layers may further independently comprise work function modifiers described in U.S. Publ. Appl. No. 20150348715. Exemplary work function modifiers include organotitanate derivatives preferably selected from the group consisting of di-alkoxy acyl titanate, tri-alkoxy acyl titanate, alkoxy triacyl titantate, alkoxy titantate, neoalkoxy titanate, titanium IV 2,2(bis 2-propenolatomethyl)butanolato, tris neodecanoato-O; titanium IV 2,2(bis 2-propenolatomethyl)butanolato, iris(dodecyl)benzene-sulfonato-O; titanium IV 2,2(bis 2-propenolatomethyl)butanolato, tris(dioctyl)phosphato-O; titanium IV 2,2(bis 2-propenolatomethyl)tris(dioctyl)pyrophosphatobutanolato-O; titanium IV 2,2(bis 2-propenolatomethyl)butanolato, tris (2-ethylenediamino)ethylato; and titanium IV 2,2(bis 2-propenolatomethyl)butanolato, tris(3-amino)phenylato being representative neoalkoxy titanates and derivatives thereof. Furthermore, the work function modifier can be a compound selected from the group consisting of cycloaliphatic epoxy resin, ethylene glycol diglycidyl ether, bisphenol A epoxy resin, bisphenol F epoxy resin, bisphenol S epoxy resin, novolac epoxy resin, aliphatic epoxy resin, glycidylamine epoxy resin, ethylene glycol diglycidyl ether (EGDGE), propylene glycol diglycidyl ether (PGDGE), 1,4-butanediol diglycidyl ether (BDDGE), pentylene glycol diglycidyl ether, hexylene glycol diglycidyl ether, cyclohexane dimethanol diglycidyl ether, resorcinol glycidyl ether, glycerol diglycidyl ether (GDGE), glycerol polyglycidyl ethers, diglycerol polyglycidyl ethers, trimethylolpropane polyglycidyl ethers, sorbitol diglycidyl ether (Sorbitol-DGE), sorbitol polyglycidyl ethers, polyethylene glycol diglycidyl ether (PEGDGE), polypropylene glycol diglycidyl ether, polytetramethylene glycol diglycidyl ether, di(2,3-epoxypropyl)ether, 1,3-butadiene diepoxide, 1,5-hexadiene diepoxide, 1,2,7,8-diepoxyoctane, 1,2,5,6-diepoxycyclooctane, 4-vinyl cyclohexene diepoxide, bisphenol A diglycidyl ether, maleimide-epoxy compounds, and derivatives thereof.

External polymer layers may further independently comprise nonionic polymers such as a hydroxy-functional nonionic polymer. The term "hydroxy-functional" generally means that the compound contains at least one hydroxyl functional group. The molecular weight of the hydroxy-functional polymer may be from about 100 to 10,000 grams per mole, in some embodiments from about 200 to 2.000, in some embodiments from about 300 to about 1,200, and in some embodiments, from about 400 to about 800.

Any of a variety of hydroxy-functional nonionic polymers may generally be employed. In one embodiment, for example, the hydroxy-functional polymer is a polyalkylene ether. Polyalkylene ethers may include polyalkylene glycols such as polyethylene glycols, polypropylene glycols polytetramethylene glycols, polyepichlorohydrins; polyoxetanes, polyphenylene ethers, polyether ketones, and the like. Polyalkylene ethers are typically predominantly linear, nonionic polymers with terminal hydroxy groups. Particularly suitable are polyethylene glycols, polypropylene glycols and polytetramethylene glycols (polytetrahydrofurans). The diol component may be selected, in particular, from saturated or unsaturated, branched or unbranched, aliphatic dihydroxy compounds containing 5 to 36 carbon atoms or aromatic dihydroxy compounds, such as, for example, pentane-1,5-diol, hexane-1,6-diol, neopentyl glycol, bis-(hydroxymethyl)-cyclohexanes, bisphenol A, dimer diols, hydrogenated dimer diols or even mixtures of the diols mentioned.

In addition to those noted above, other hydroxy-functional nonionic polymers may also be employed. Some examples of such polymers include, for instance, ethoxylated alkylphenols; ethoxylated or propoxylated $C_6$-$C_{24}$ fatty alcohols; polyoxyethylene glycol alkyl ethers having the general formula: $CH_3$—$(CH_2)_{10\text{-}16}$—$(O$—$C_2H_4)_{1\text{-}25}$—OH (e.g., octaethylene glycol monododecyl ether and pentaethylene glycol monododecyl ether); polyoxypropylene glycol alkyl ethers having the general formula: $CH_3$—$(CH_2)_{10\text{-}16}$—

(O—$C_3H_6$)$_{1-25}$—OH; polyoxyethylene glycol octylphenol ethers having the following general formula: $C_8$—$H_{17}$—($C_6H_4$)—(O—$C_2H_4$)$_{1-25}$—OH (e.g., Triton™ X-100); polyoxyethylene glycol alkylphenol ethers having the following general formula: $C_9$—$H_{19}$—($C_6H_4$)—(O—$C_2H_4$)$_{1-25}$—OH (e.g., nonoxynol-9); polyoxyethylene glycol esters of $C_8$-$C_{21}$ fatty acids, such as polyoxyethylene glycol sorbitan alkyl esters (e.g., polyoxyethylene (20) sorbitan monolaurate, polyoxyethylene (20) sorbitan monopalmitate, polyoxyethylene (20) sorbitan monostearate, polyoxyethylene (20) sorbitan monooleate, PEG-20 methyl glucose distearate, PEG-20 methyl glucose sesquistearate, PEG-80 castor oil, and PEG-20 castor oil, PEG-3 castor oil, PEG 600 dioleate, and PEG 400 dioleate) and polyoxyethylene glycerol alkyl esters (e.g., polyoxyethylene-23 glycerol laurate and polyoxyethylene-20 glycerol stearate); polyoxyethylene glycol ethers of $C_8$-$C_{24}$ fatty acids (e.g., polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, polyoxyethylene-20 isohexadecyl ether, polyoxyethylene-15 tridecyl ether, and polyoxyethylene-6 tridecyl ether); block copolymers of polyethylene glycol and so forth.

The conductive polymer solution or dispersion may have a pH of 1 to 14, preference being given to a pH of 1 to 10, particularly preferred is a pH of 1 to 8 with the pH being measured at 25° C. To adjust the pH, bases or acids, for example, can be added to the solutions or dispersions. The bases used may be inorganic bases, for example sodium hydroxide, potassium hydroxide, calcium hydroxide or ammonia, or organic bases, for example ethylamine, diethylamine, triethylamine, propylamine, dipropylamine, tripropylamine, isopropylamine, diisopropylamine, butylamine, dibutylamine, tributylamine, isobutylamine, diisobutylamine, triisobutylamine, 1-methylpropylamine, methylethylamine, bis(1-methyl)propylamine, 1,1-dimethylethylamine, pentylamine, dipentylamine, tripentylamine, 2-pentylamine, 3-pentylamine, 2-methyl-butylamine, 3-methylbutylamine, bis(3-methyl-butylamine) methylbutylamine), hexylamine, octylamine, 2-ethylhexylamine, decylamine, N-methyl-butylamine, N-ethylbutylamine, N,N-dimethylethylamine, N,N-dimethylpropyl, N-ethyldiisopropylamine, allylamine, diallylamine, ethanolamine, diethanolamine, triethanolamine, methylethanolamine, methyl-diethanolamine, dimethylethanolamine, diethyl-ethanolamine, N-butylethanolamine, N-butyldiethanol-amine, dibutylethanolamine, cyclohexylethanolamine, cyclohexyldiethanolamine, N-ethylethanolamine, N-propylethanolamine, tert-butylethanolamine, tert-butyl-diethanolamine, propanolamine, dipropanolamine, tripropanolamine or benzylamine, bi-, tri-, or tetra-functional amines. The acids used may be inorganic acids, for example sulfuric acid, phosphoric acid or nitric acid, or organic acids, for example carboxylic or sulfonic acids.

Figure 2:
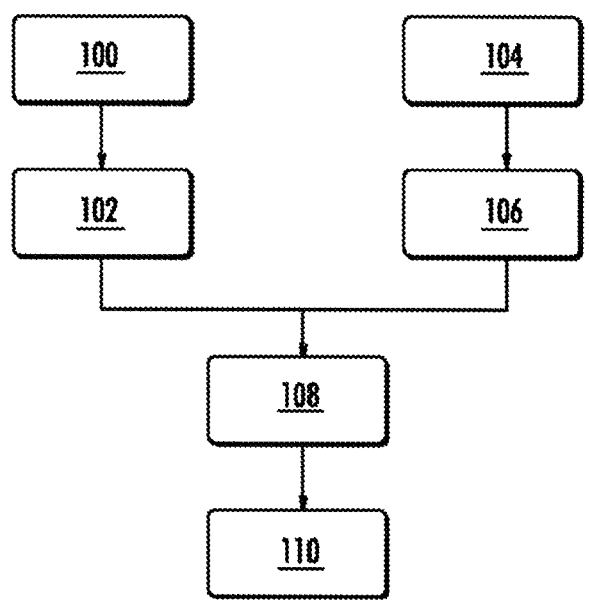
FIG. 2 is a flow chart representation of an embodiment of the invention.

The process for forming a capacitor will be described with reference to FIG. 2 wherein the process is represented schematically. In FIG. 2, droplets of monomer are formed in monomer solution comprising at least 3 wt % monomer and polyanion to no more than 10 wt % monomer and polyanion at 100 preferably by a stator rotor. The droplets are then polymerized by high shear polymerization preferably in the presence of polyanion thereby forming a polymer dispersion at 102 wherein the polymer dispersion comprises at least a bimodal size distribution of conducting polymer/polyanion particles. An anode is prepared at 104 wherein the anode is a conductor, and preferably a valve metal. A dielectric is formed on the anode at 106 wherein the preferred dielectric is an oxide of the anode. A conductive polymer layer of the polymer is formed on the dielectric at 108 thereby forming a conductive couple with a dielectric there between. At least one layer of the conductive polymer layer is formed by application of the dispersion comprising the conductive polymer/polyanion particles in at least a bimodal size distribution. The dispersion is preferably applied by dipping. In a preferred embodiment an internal polymer layer is formed prior to application of the dispersion comprising the conductive polymer/polyanion particles in at least a bimodal size distribution. The capacitor is finished at 110 wherein finishing can include but is not limited to testing, forming external terminations, encapsulating and the like.

The anode material is not limited herein. A particularly preferred anode material is a metal and a particularly preferred metal is a valve metal or a conductive oxide of a valve metal. Particularly preferred anodes include niobium, aluminum, tantalum and NbO without limit thereto.

The dielectric is not particularly limited herein. A particularly preferred dielectric is an oxide of the anode due to manufacturing considerations.

Throughout the description terms such as "alkyl", "aryl", "alkylaryl", "arylalkyl" refer to unsubstituted or substituted groups and if already listed as substituted, such as "alkyl alcohol" refer to groups which are not further substituted or may be further substituted.

Test Methods

Corners and Edge Coverage Measurement

Corner and edge coverage of conducting polymer dispersions on an anodized anode in solid electrolytic capacitors was inspected under a microscope and scaled per the following criteria: corners and edges not covered 85%, edges covered and corners not covered 90%, edges covered and half of corners covered 95%; corners and edges appear completely covered 100%.

Particle Size Analysis

The particle size of conducting polymer:polyanion complex particles was measured using a disk centrifuge particle size analyzer from CPS instruments. A diameter distribution of the particles relates to a weight distribution of the particles in the dispersion as a function of the particle diameter. In this context, the $D_{10}$ value of the diameter distribution states that 10% of the total weight of all the particles of conductive polymer polyanion complex in the dispersion can be assigned to particles which have a diameter of less than or equal to the $D_{10}$ value. The $D_{50}$ value of the diameter distribution states that 50% of the total weight of all the particles of conductive polymer in the dispersion can be assigned to particles which have a diameter of less than or equal to the $D_{50}$ value. The $D_{90}$ value of the diameter distribution states that 90% of the total weight of all the particles of conductive polymer in the dispersion can be assigned to particles which have a diameter of less than or equal to the $D_{90}$ value.

EXAMPLES

Example 1

Poly(4-styrenesulfonic acid-co-poly(ethylene glycol) methacrylate) sodium salt was synthesized. A 500 ml flask was initially charged with 33 ml deionized water as a solvent. After adding 8 g styrenesulfonic acid sodium salt, 2 g poly(ethylene glycol) methyl ether methacrylate (Mn 480) and 1 g ammonium persulfate, the mixture was saturated with nitrogen by means of a gas inlet tube. Nitrogen was passed through the mixture for 15 min. and during this time, the mixture was heated to 80° C. The flask was sealed with a rubber septum and the solution was allowed to polymerize for 16 hours. The resulting polyanion copolymer was acidified with dilute sulfuric acid and used directly for preparation of conducting polymer dispersion.

Example 2

The conductive polymer dispersion was synthesized by high shear polymerization. 1740 g of DI water and 166 g of PSSA 30% (Alfa Aesar) were charged into a 4 L polyethylene bottle. The reaction solution was purged with nitrogen for 0.5-1 hr. The contents were mixed using a rotor-stator mixing system with perforated stator screen with a round hole diameter of 1.5 mm. Subsequently, 57 g of 1% ferric sulfate solution and 43 g of sodium persulfate were then added into the reaction mixture, followed by dropwise addition of 22.5 g of 3,4-ethylenedioxythiophene (EDOT) (Baytron M from Heraeus). The reaction mixture containing 3.56% solids of monomer and polyanion was sheared continuously with a shear speed at 4200 rpm for 24 hours. 600 g of Lewatit S108H and 600 g of Lewatit MP62WS ion exchange resins were added into the slurry and rolled at around 60 rpm overnight. The conductive polymer dispersion was separated from resins by filtration. The resulting poly(3,4-ethylenedioxythiophene)/polystyrene sulfonic acid dispersion had a bimodal particle size distribution with second particle having a $D_{50}$ particle size of 350 nm and first particle having a $D_{50}$ particles size of 3.50 micron.

Example 2-1

The conducting polymer dispersion prepared as per procedure in example 2 was further homogenized with an ultrasonicator. The resulting dispersion also has bimodal particle size distribution with $D_{50}$ of 25 nm and 75 nm.

Example 3

1740 g of DI water and 166 g of polyanion copolymer (30%) from Example 1 were charged into a 4 L polyethylene bottle. The reaction solution was purged with nitrogen for 0.5-1 hr. The contents were mixed using a rotor-stator mixing system with perforated stator screen with a round hole diameter of 1.5 mm. Subsequently, 57 g of 1% ferric sulfate solution and 43 g of sodium persulfate were then added into the reaction mixture, followed by dropwise addition of 22.5 g of 3,4-ethylenedioxythiophene (EDOT) (Baytron M from Heraeus). The reaction mixture containing 3.56% solids of monomer and polyanion was sheared continuously with a shear speed at 4200 rpm for 24 hours. 600 g of Lewatit S108H and 600 g of Lewatit MP62WS ion exchange resins were added into the slurry and rolled at around 60 rpm overnight. The conductive polymer dispersion was separated from resins by filtration. The resulting poly(3,4-ethylenedioxythiophene)/poly(4-styrenesulfonic acid-co-poly(ethylene glycol) methacrylate) dispersion had a bimodal particle size distribution with second particle having a $D_{50}$ particles size of 250 nm and first particle having a $D_{50}$ particles size of 3.50 micron.

Example 3-1

The conducting polymer dispersion prepared as per procedure in example 3 was further homogenized with an ultrasonicator. The resulting dispersion also has bimodal particle size distribution with $D_{50}$ of 20 nm and 65 nm.

Example 4

2805 g of DI water and 336 g of polyanion copolymer (40%) from Example 1 were charged into a 4 L polyethylene bottle. The reaction solution was purged with nitrogen for 0.5-1 hr. The contents were mixed using a rotor-stator mixing system with perforated stator screen with a round hole diameter of 1.5 mm. Subsequently, 141.3 g of 1% ferric sulfate solution and 106.65 g of sodium persulfate were then added into the reaction mixture, followed by dropwise addition of 22.5 g of 3,4-ethylenedioxythiophene (EDOT) (Baytron M from Heraeus). The reaction mixture containing 5.20% solids of monomer and polyanion was sheared continuously with a shear speed at 4200 rpm for 24 hours. 1486 g of Lewatit S108H and 1486 g of Lewatit MP62WS ion exchange resins were added into the slurry and rolled at around 60 rpm overnight. The conductive polymer dispersion was separated from resins by filtration. The resulting poly(3,4-ethylenedioxythiophene)/poly(4-styrenesulfonic acid-co-poly(ethylene glycol) methacrylate) dispersion had a bimodal particle size distribution with first particle having a $D_{50}$ particles size of 3.50 micron and second particle having a $D_{50}$ particles size of 300 nm.

Comparative Example 1

2531 g of DI water and 125 g of PSSA 30% (Alfa Aesar) were charged into a 4 L polyethylene bottle. The reaction solution was purged with nitrogen for 0.5-1 hr. The contents were mixed using a rotor-stator mixing system with perforated stator screen with a round hole diameter of 1.5 mm. Subsequently, 28.5 g of 1% ferric sulfate solution and 21.5 g of sodium persulfate were then added into the reaction mixture, followed by dropwise addition of 11.25 g of 3,4-ethylenedioxythiophene (EDOT) (Baytron M from Heraeus). The reaction mixture containing 1.79% solids of monomer and polyanion was sheared continuously with a shear speed at 4200 rpm for 24 hours. 300 g of Lewatit S108H and 300 g of Lewatit MP62WS ion exchange resins were added into the slurry and rolled at around 60 rpm overnight. The conductive polymer dispersion was separated from resins by filtration. The resulting poly(3,4-ethylenedioxythiophene)/polystyrene sulfonic acid dispersion had a monomodal particle size distribution with a $D_{50}$ particles size of 110 nm.

Comparative Example 2

2531 g of DI water and 125 g of polyanion copolymer (30%) from Example 1 were charged into a 4 L polyethylene bottle. The reaction solution was purged with nitrogen for 0.5-1 hr. The contents were mixed using a rotor-stator mixing system with perforated stator screen with a round hole diameter of 1.5 mm. Subsequently, 28.5 g of 1% ferric sulfate solution and 21.5 g of sodium persulfate were then added into the reaction mixture, followed by dropwise addition of 11.25 g of 3,4-ethylenedioxythiophene (EDOT) (Baytron M from Heraeus). The reaction mixture containing 1.79% solids of monomer and polyanion was sheared continuously with a shear speed at 4200 rpm for 24 hours. 300 g of Lewatit S108H and 300 g of Lewatit MP62WS ion exchange resins were added into the slurry and rolled at around 60 rpm overnight. The conductive polymer dispersion was separated from resins by filtration. The resulting poly(3,4-ethylenedioxythiophene/poly(4-styrenesulfonic acid-co-poly(ethylene glycol) methacrylate) dispersion had a monomodal particle size distribution with a $D_{50}$ particle size of 80 nm.

Example 5

Conducting polymer dispersions from Example 2 were mixed with DMSO, 3-glycidoxypropyltrimethoxysilane and reactive monomer/oligomer containing at least three epoxy groups followed by mixing on roller overnight.

Example 6

Conducting polymer dispersions from Example 3 were mixed with DMSO, 3-glycidoxypropyltrimethoxysilane and reactive monomer/oligomer containing at least three epoxy groups followed by mixing on roller overnight.

Example 6-1

Conducting polymer dispersions formulated in same manner as example 6 except mixture of conducting polymer dispersion from example 3 and example 3-1 in ratio of 2:8 were used.

Comparative Example 3

Conducting polymer dispersions from comparative Example 1 were mixed with DMSO, 3-glycidoxypropyltrimethoxysilane and reactive monomers containing two epoxy and two carboxylic groups followed by mixing on roller overnight.

Comparative Example 4

Conducting polymer dispersions from comparative Example 2 were mixed with DMSO, 3-glycidoxypropyltrimethoxysilane and reactive monomer/oligomer containing at least three epoxy groups followed by mixing on roller overnight.

Example 7

Solid electrolytic capacitors were prepared by standard techniques. A series of tantalum anodes (33 microfarads, 35V) were prepared. The tantalum was anodized to form a dielectric on the tantalum anode. The anodes thus formed were dipped into a solution of iron (III) toluenesulfonate oxidant for 1 minute and sequentially dipped into ethyldioxythiophene monomer for 1 minute to form a thin layer of conductive polymer (PEDOT) on the dielectric of the anodized anodes. The anodized anodes were washed to remove excess monomer and by-products of the reactions after the completion of 60 minutes of polymerization. This process was repeated until a sufficient thickness was achieved. Conductive polymer dispersion from Example 5 was applied and subsequently dried to form an external polymer layer. This process were repeated 4 times. The parts were inspected under microscope for corners and edge coverage. A sequential coating of a graphite layer and a silver layer were applied to produce a solid electrolytic capacitor. Parts were assembled and packaged.

Inventive Example 8

A series of tantalum anodes (33 microfarads, 35V) were prepared. The tantalum were anodized to form a dielectric on the tantalum anode. The anodes thus formed was dipped into a solution of iron (III) toluenesulfonate oxidant for 1 minute and sequentially dipped into ethyldioxythiophene monomer for 1 minute to form an a thin layer of conductive polymer (PEDOT) on the dielectric of the anodized anodes. The anodized anodes were washed to remove excess monomer and by-products of the reactions after the completion of 60 minutes of polymerization. This process was repeated until a sufficient thickness was achieved. Conductive polymer dispersion from Example 6 was applied and subsequently dried to form an external polymer layer. This process were repeated 4 times. The parts were inspected under microscope for corners and edge coverage. A sequential coating of a graphite layer and a silver layer were applied to produce a solid electrolytic capacitor. Parts were assembled and packaged.

Inventive Example 8-1

A solid electrolytic capacitor were produced in same manner as shown in inventive example 8 except conductive polymer dispersion from Example 6-1 was used.

Inventive Example 8-2

A solid electrolytic capacitor were produced in same manner as shown in inventive example 8-1 except internal layer was formed by pre-polymerized conductive polymer.

Inventive Example 8-3

A solid electrolytic capacitor were produced in same manner as shown in inventive example 8-2 except organometalic compound was applied between dielectric and pre-polymerized conducting polymer.

Inventive Example 8-4

A solid electrolytic capacitor were produced in same manner as shown in inventive example 8-3 except cross-linker solution was applied between external polymer layers.

Inventive Example 8-5

A solid electrolytic capacitor were produced in same manner as shown in inventive example 8-3 except cross-linker or primer solution was applied between internal polymer layer and external polymer.

Comparative Example 5

A series of tantalum anodes (33 microfarads, 35V) were prepared. The tantalum was anodized to form a dielectric on the tantalum anode. The anodes thus formed was dipped into a solution of iron (III) toluenesulfonate oxidant for 1 minute and sequentially dipped into ethyldioxythiophene monomer for 1 minute to form a thin layer of conductive polymer (PEDOT) on the dielectric of the anodized anodes. The anodized anodes were washed to remove excess monomer and by-products of the reactions after the completion of 60 minutes of polymerization. This process was repeated until a sufficient thickness was achieved. Conductive polymer dispersion from comparative Example 3 was applied and subsequently dried to form an external polymer layer. This process were repeated 4 times. The parts were inspected under microscope for corners and edge coverage. A sequential coating of a graphite layer and a silver layer were applied to produce a solid electrolytic capacitor. Parts were assembled and packaged.

Comparative Example 6

A series of tantalum anodes (33 microfarads, 35V) were prepared. The tantalum was anodized to form a dielectric on the tantalum anode. The anodes thus formed were dipped into a solution of iron (III) toluenesulfonate oxidant for 1 minute and sequentially dipped into ethyldioxythiophene monomer for 1 minute to form an a thin layer of conductive polymer (PEDOT) on the dielectric of the anodized anodes. The anodized anodes were washed to remove excess monomer and by-products of the reactions after the completion of 60 minutes of polymerization. This process was repeated until a sufficient thickness was achieved. Conductive polymer dispersion from Comparative Example 4 was applied and subsequently dried to form an external polymer layer. This process was repeated 4 times. The parts were inspected under microscope for corners and edge coverage. A sequential coating of a graphite layer and a silver layer were applied to produce a solid electrolytic capacitor. Parts were assembled and packaged.

Comparative Example 7

A series of tantalum anodes (33 microfarads, 35V) were prepared. The tantalum was anodized to form a dielectric on the tantalum anode. The anodes thus formed were dipped into a solution of iron (III) toluenesulfonate oxidant for 1 minute and sequentially dipped into ethyldioxythiophene monomer for 1 minute to form an a thin layer of conductive polymer (PEDOT) on the dielectric of the anodized anodes. The anodized anodes were washed to remove excess monomer and by-products of the reactions after the completion of 60 minutes of polymerization. This process was repeated until a sufficient thickness was achieved. A commercial conductive polymer dispersion Clevios® KV2 was applied and subsequently dried to form an external polymer layer. This process was repeated 4 times. The parts were inspected under microscope for corners and edge coverage. A sequential coating of a graphite layer and a silver layer were applied to produce a solid electrolytic capacitor. Parts were assembled and packaged.

Comparative Example 8

A series of tantalum anodes (33 microfarads, 35V) were prepared. The tantalum was anodized to form a dielectric on the tantalum anode. The anodes thus formed was dipped into a solution of iron (III) toluenesulfonate oxidant for 1 minute and sequentially dipped into ethyldioxythiophene monomer for 1 minute to form an a thin layer of conductive polymer (PEDOT) on the dielectric of the anodized anodes. The anodized anodes were washed to remove excess monomer and by-products of the reactions after the completion of 60 minutes of polymerization. This process was repeated until a sufficient thickness was achieved. Conductive polymer dispersion from Comparative Example 4 was applied to form an external polymer layer. After drying, alternating layers of a commercial crosslinker solution, Clevios® K Primer, and conductive polymer dispersion from Comparison Example 2 were applied and repeated 4 times. The parts were washed with hot water to remove excess Clevios® K Primer and subsequently dried in oven. The parts were inspected under microscope for corners and edge coverage. A sequential coating of a graphite layer and a silver layer were applied to produce a solid electrolytic capacitor. Parts were assembled and packaged.

Comparative Example 9

A series of tantalum anodes (33 microfarads, 35V) were prepared. The tantalum was anodized to form a dielectric on the tantalum anode. The anodes thus formed were dipped into a solution of iron (III) toluenesulfonate oxidant for 1 minute and sequentially dipped into ethyldioxythiophene monomer for 1 minute to form a thin layer of conductive polymer (PEDOT) on the dielectric of the anodized anodes. The anodized anodes were washed to remove excess monomer and by-products of the reactions after the completion of 60 minutes of polymerization. This process was repeated until a sufficient thickness was achieved. A commercial conductive polymer dispersion Clevios® KV2 was applied to form an external polymer layer. After drying, alternating layers of a commercial crosslinker solution, Clevios® K Primer, and conductive polymer dispersion from Comparison Example 2 were applied and repeated 4 times. The parts were washed with hot water to remove excess Clevios® K Primer and subsequently dried in an oven. The parts were inspected under microscope for corners and edge coverage. A sequential coating of a graphite layer and a silver layer were applied to produce a solid electrolytic capacitor. Parts were assembled and packaged.

The performance results of inventive conductive polymer dispersion in solid electrolytic capacitor are summarized in Table 1 and Table 2.

TABLE 1

Effect of bimodal particle size distribution on coverage.

| | Coverage |
|---|---|
| Example 7 | 100% |
| Example 8 | 100% |
| Comparison Example 5 | 85% |
| Comparison example 6 | 90% |
| Comparison example 7 | 90% |

TABLE 2

ESR and Leakage reliability under humid atmosphere

| | Load 85° C./ 85% RH Mean ESR (mΩ) | | Biased HAST leakage failure | |
|---|---|---|---|---|
| | 0 Hr ESR | 1000 Hrs | No. of failed pcs at 0 Hr | No. of failed pcs at 63 Hrs |
| Inventive Example 8 | 32.1 | 37.4 | 0/20 | 0/20 |
| Comparison Example 8 | 27.1 | 71.1 | 0/20 | 3/20 |
| Comparison Example 9 | 31.7 | 1426 | 0/20 | 4/20 |

The advantages of the dispersion with at least a bi-modal size distribution are manifest in improvements in the coating quality and performance of the solid electrolytic capacitor. The invention has been described with reference to the preferred embodiments without limit thereto. One of skill in the art would realize additional embodiments and improvements which are within the metes and bounds of the invention as more specifically set forth in the claims appended hereto.

The invention claimed is:

1. A dispersion comprising:
   first particles comprising conductive polymer and polyanion wherein said first particles have an average particle diameter of at least 1 micron to no more than 10 microns;
   second particles comprising said conductive polymer and said polyanion wherein said second particles have an average particle diameter of at least 1 nm to no more than 600 nm;
   wherein said conductive polymer comprises conjugated groups having the structure of Formula I:

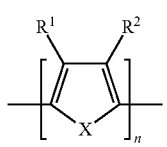

Formula 1 wherein:
   $R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements;
   $R^3$ represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl; and
   X is S, N or O; and
   said polyanion is represented by Formula 2:

$A_xB_yC_z$  Formula 2 wherein:
   A is polystyrenesulfonic acid or salt of polystyrenesulfonate;
   B and C separately represent polymerized units substituted with a group selected from:
   -carboxyl groups;
   —C(O)OR$^6$ wherein R$^6$ is selected from the group consisting of:
   an alkyl of 1 to 20 carbons optionally substituted with a functional group selected from the group consisting of hydroxyl, carboxyl, amine, epoxy, silane, amide, imide, thiol, alkene, alkyne, azide, phosphate, acrylate, anhydride and
      —(CHR$^7$CH$_2$O)$_b$—R$^8$ wherein:
      R$^7$ is selected from a hydrogen or an alkyl of 1 to 7 carbons;
      b is an integer from 1 to the number sufficient to provide a molecular weight of up to 200,000 for the —CHR$^7$CH$_2$O— group; and
      R$^8$ is selected from the group consisting of hydrogen, silane, phosphate, acrylate, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate, and anhydride;
   —C(O)—NHR$^9$ wherein:
   R$^9$ is hydrogen or an alkyl of 1 to 20 carbons optionally substituted with a functional group selected from the group consisting of hydroxyl, carboxyl, amine, epoxy, silane, amide, imide, thiol, alkene, alkyne, phosphate, azide, acrylate and anhydride;
   —C$_6$H$_4$—R$^{10}$ wherein:
   R$^{10}$ is selected from:
   a hydrogen or alkyl optionally substituted with a functional group selected from the group consisting of hydroxyl, carboxyl, amine, epoxy, silane, amide, imide, thiol, alkene, alkyne, phosphate, azide, acrylate and anhydride;
   a reactive group selected from the group consisting of hydroxyl, carboxyl, amine, epoxy, silane, imide, amide, thiol, alkene, alkyne, phosphate, azide, acrylate, anhydride and
      —(O(CHR$^{11}$CH$_2$O)$_d$—R$^{12}$ wherein:
      R$^{11}$ is a hydrogen or an alkyl of 1 to 7 carbons;
      d is an integer from 1 to the number sufficient to provide a molecular weight of up to 200,000 for the —CHR$^{11}$CH$_2$O— group;
      R$^{12}$ is selected from the group consisting of hydrogen, an alkyl of 1 to 9 carbons optionally substituted with a functional group selected from the group consisting of hydroxyl, carboxyl, amine, epoxy, silane, amide, imide, thiol, alkene, alkyne, phosphate, azide, acrylate and anhydride;
   —C$_6$H$_4$—O—R$^{13}$ wherein:
   R$^{13}$ is selected from:
   a hydrogen or an alkyl optionally substituted with a reactive group selected from the group consisting of hydroxyl, carboxyl, amine, epoxy, silane, amide, imide, thiol, alkene, alkyne, azide, acrylate, phosphate and anhydride;
   a reactive group selected from the group consisting of epoxy, silane, alkene, alkyne, acrylate, phosphate and
      —(CHR$^{14}$CH$_2$O)$_e$—R$^{15}$ wherein:
      R$^{14}$ is a hydrogen or an alkyl of 1 to 7 carbons;
      e is an integer from 1 to the number sufficient to provide a molecular weight of up to 200,000 for the —CHR$^{14}$CH$_2$O— group; and
      R$^{15}$ is selected from the group consisting of hydrogen and an alkyl of 1 to 9 carbons optionally substituted with a functional group selected from the group consisting of hydroxyl, carboxyl, amine, epoxy, silane, amide, imide, thiol, alkene, alkyne, azide, acrylate, phosphate and anhydride;
   x, y and z, taken together are sufficient to form a polyanion with a molecular weight of at least 100 to no more than 500,000;
   y/x is 0 to 100; and
   z is 0 to a ratio z/x of no more than 100 wherein a portion of said dispersion is further subjected to rotor-stator high shear mixing, ultrasonic mixing, acoustic mixing, high-pressure homogenizing or high shearing homogenizing.

2. The dispersion of claim 1 wherein said first particles have a $D_{50}$ which is at least 1 micron to no more than 5 microns.

3. The dispersion of claim 2 wherein said first particles have a $D_{50}$ which is at least and even more preferably at least 2 microns to no more than 4 microns.

4. The dispersion of claim 1 wherein said second particles have a $D_{50}$ of 100 nm to no more than 500 nm.

5. The dispersion of claim 4 wherein said second particles have a $D_{50}$ of and even more preferably at least 200 nm to no more than 400 nm.

6. The dispersion of claim 1 wherein $R^1$ and $R^2$ of Formula I are taken together to represent —O—(CHR$^4$)$_n$—O— wherein:

n is an integer from 1 to 5;

$R^4$ is independently selected from hydrogen; a linear or branched $C_1$ to $C_{18}$ alkyl radical $C_5$ to $C_{12}$ cycloalkyl radical, $C_6$ to $C_{14}$ aryl radical Cr to $C_{18}$ aralkyl radical or $C_1$ to $C_4$ hydroxyalkyl radical, optionally substituted with a functional group selected from carboxylic acid, hydroxyl, amine, substituted amines, alkene, acrylate, thiol, alkyne, azide, sulfate, sulfonate, sulfonic acid, imide, amide, epoxy, anhydride, silane, and phosphate; hydroxyl radical; or $R^4$ is selected from —$(CHR^5)_a$—$R^{16}$; —$O(CHR^5)_aR^{16}$; —$CH_2O(CHR^5)_aR^{16}$; —$CH_2O(CH_2CHR^5O)_aR^{16}$, or $R^4$ is a functional group selected from the group consisting of hydroxyl, carboxyl, amine, epoxy, amide, imide, anhydride, hydroxymethyl, alkene, thiol, alkyne, azide, sulfonic acid, benzene sulfonic acidsulfate, $SO_3M$, anhydride, silane, acrylate and phosphate;

$R^5$ is H or alkyl chain of 1 to 5 carbons optionally substituted with a functional groups selected from carboxylic acid, hydroxyl, amine, alkene, thiol, alkyne, azide, epoxy, acrylate and anhydride;

$R^{16}$ is H or $SO_3M$ or an alkyl chain of 1 to 5 carbons optionally substituted with a functional groups selected from carboxylic acid, hydroxyl, amine, substituted amines, alkene, thiol, alkyne, azide, amide, imide, sulfate, $SO_3M$, amide, epoxy, anhydride, silane, acrylate and phosphate;

a is integer from 0 to 10; and

M is a H or cation preferably selected from ammonia, sodium or potassium.

7. The dispersion of claim 6 wherein n is 2.

8. The dispersion of claim 1 wherein said conductive polymer is water-soluble or water-dispersible.

9. The dispersion of claim 1 wherein said conductive polymer is selected from the group consisting of poly(3,4-ethylenedioxythiophene), poly(4-(2,3-dihydrothieno-[3,4-b][1,4]dioxin-2-yl)methoxy)-1-butane-sulphonic acid or salt), poly(4-(2,3-dihydrothieno-[3,4-b][1,4]dioxin-2-yl)methoxy)-1-propane-sulphonic acid or salt), poly(4-(2,3-dihydrothieno-[3,4-b][1,4]dioxin-2-yl)methoxy)-1-methyl-1-propane-sulphonic acid or salt), poly(4-(2,3-dihydrothieno-[3,4-b][1,4]dioxin-2-yl)methoxy alcohol, polythiophene, poly(3-methylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-ethylenedioxythiophene), poly(3,4-propylenedioxythiophene), poly(3,4-butenedioxythiophene), poly(3-carboxythiophene), poly(3-methyl-4-carboxythiophene), poly(3-methyl-4-carboxyethylthiophene) and poly(3-methyl-4-carboxybutylthiophene).

10. The dispersion of claim 1 wherein said conductive polymer and said polyanion are in a molar ratio of 1:0.1 to 0.1:1.

11. The dispersion of claim 10 wherein said conductive polymer and said polyanion are in a molar ratio of 1:1 to 0.2:1.

12. The dispersion of claim 11 wherein said conductive polymer and said polyanion are in a molar ratio of 0.8:1 to 0.25:1.

13. The dispersion of claim 1 wherein a molar ratio of conductive polymers to polyanion is higher for said first particles than for said second particles.

* * * * *